US012762036B2

(12) United States Patent
McCarthy et al.

(10) Patent No.: US 12,762,036 B2
(45) Date of Patent: Oct. 13, 2026

(54) RESOLVING CAPACITY RECOVERY ACROSS MULTIPLE COMPONENTS OF A STORAGE SYSTEM

(71) Applicant: Dell Products, L.P., Hopkinton, MA (US)

(72) Inventors: Jason McCarthy, Cambridge, MA (US); Girish Warrier, Natick, MA (US); Rongnong Zhou, South Grafton, MA (US)

(73) Assignee: Dell Products, L.P., Hopkinton, MA (US)

( * ) Notice: Subject to any disclaimer, the term of this patent is extended or adjusted under 35 U.S.C. 154(b) by 947 days.

(21) Appl. No.: 18/152,812

(22) Filed: Jan. 11, 2023

(65) Prior Publication Data

US 2024/0232042 A1 Jul. 11, 2024

(51) Int. Cl.
*G06F 11/34* (2006.01)
*G06F 11/30* (2006.01)

(52) U.S. Cl.
CPC ...... *G06F 11/3457* (2013.01); *G06F 11/3034* (2013.01); *G06F 11/3409* (2013.01)

(58) Field of Classification Search
CPC ............. G06F 11/3457; G06F 11/3034; G06F 11/3409; G06F 11/3485
See application file for complete search history.

(56) References Cited

U.S. PATENT DOCUMENTS 6,804,819 B1 * 10/2004 Bates ...................... H04L 69/40 719/318
8,924,595 B1 * 12/2014 Joyce .................... G06F 11/261 710/5
11,294,584 B1 4/2022 McCarthy et al.

* cited by examiner

*Primary Examiner* — Kevin Verbrugge
(74) *Attorney, Agent, or Firm* — Anderson Gorecki LLP

(57) ABSTRACT

Workload from a host or a set of hosts is directed to a set of storage volumes that are formed from storage resources that are grouped together in a storage group on a storage system. The workload on the storage group impacts many components of the storage system, including front-end ports and directors, shared global memory, back-end ports and directors, and back-end storage resources. The workload may also affect systems applications such as remote data forwarding (RDF) applications that also consume storage system resources such as RDF ports and directors and shared global memory. A workload planner characterizes workloads on the storage groups and overall workloads on components of the storage system, and contains control logic configured to resolve capacity recovery across multiple components of a storage system in connection with simulated removal of a storage group from the storage system.

18 Claims, 13 Drawing Sheets

FIG. 3

Storage System Component KPI Data Structure 210

| KPI | Week 1 data | | | | | | Week 2 data | | | | | |
|---|---|---|---|---|---|---|---|---|---|---|---|---|
| Front-end Port #1 (MBPS) | 0 | 1 | 2 | ••• | 40 | 41 | 0 | 1 | 2 | ••• | 40 | 41 |
| ••• | | | | | | | | | | | | |
| Front-end Port #N (MBPS) | 0 | 1 | 2 | ••• | 40 | 41 | 0 | 1 | 2 | ••• | 40 | 41 |
| Front-end Port #1 Utilization | 0 | 1 | 2 | ••• | 40 | 41 | 0 | 1 | 2 | ••• | 40 | 41 |
| ••• | | | | | | | | | | | | |
| Front-end Port #N Utilization | 0 | 1 | 2 | ••• | 40 | 41 | 0 | 1 | 2 | ••• | 40 | 41 |
| Director #1 (IOPS) | 0 | 1 | 2 | ••• | 40 | 41 | 0 | 1 | 2 | ••• | 40 | 41 |
| ••• | | | | | | | | | | | | |
| Director #N (IOPS) | 0 | 1 | 2 | ••• | 40 | 41 | 0 | 1 | 2 | ••• | 40 | 41 |
| Director #1 Utilization | 0 | 1 | 2 | ••• | 40 | 41 | 0 | 1 | 2 | ••• | 40 | 41 |
| ••• | | | | | | | | | | | | |
| Director #N Utilization | 0 | 1 | 2 | ••• | 40 | 41 | 0 | 1 | 2 | ••• | 40 | 41 |
| Back-end ports (MBPS) | 0 | 1 | 2 | ••• | 40 | 41 | 0 | 1 | 2 | ••• | 40 | 41 |
| Back-end ports Utilization | 0 | 1 | 2 | ••• | 40 | 41 | 0 | 1 | 2 | ••• | 40 | 41 |
| Write pending slot use counter | 0 | 1 | 2 | ••• | 40 | 41 | 0 | 1 | 2 | ••• | 40 | 41 |
| RDFA slot use counter | 0 | 1 | 2 | ••• | 40 | 41 | 0 | 1 | 2 | ••• | 40 | 41 |
| Utilization | 0 | 1 | 2 | ••• | 40 | 41 | 0 | 1 | 2 | ••• | 40 | 41 |
| EPL growth factor | 0 | 1 | 2 | ••• | 40 | 41 | 0 | 1 | 2 | ••• | 40 | 41 |

FIG. 4

Storage Group KPI Data Structure 215

| KPI | Week 1 data | | | | | | Week 2 data | | | | | |
|---|---|---|---|---|---|---|---|---|---|---|---|---|
| SG #1 read hit (IOPS) | 0 | 1 | 2 | ••• | 40 | 41 | 0 | 1 | 2 | ••• | 40 | 41 |
| SG #1 read hit (MBPS) | 0 | 1 | 2 | ••• | 40 | 41 | 0 | 1 | 2 | ••• | 40 | 41 |
| SG #1 read miss (IOPS) | 0 | 1 | 2 | ••• | 40 | 41 | 0 | 1 | 2 | ••• | 40 | 41 |
| SG #1 read miss (MBPS) | 0 | 1 | 2 | ••• | 40 | 41 | 0 | 1 | 2 | ••• | 40 | 41 |
| SG #1 write hit (IOPS) | 0 | 1 | 2 | ••• | 40 | 41 | 0 | 1 | 2 | ••• | 40 | 41 |
| SG #1 write hit (MBPS) | 0 | 1 | 2 | ••• | 40 | 41 | 0 | 1 | 2 | ••• | 40 | 41 |
| SG #1 write miss (IOPS) | 0 | 1 | 2 | ••• | 40 | 41 | 0 | 1 | 2 | ••• | 40 | 41 |
| SG #1 write miss (MBPS) | 0 | 1 | 2 | ••• | 40 | 41 | 0 | 1 | 2 | ••• | 40 | 41 |
| SG #1 sequential read (IOPS) | 0 | 1 | 2 | ••• | 40 | 41 | 0 | 1 | 2 | ••• | 40 | 41 |
| SG #1 sequential read (MBPS) | 0 | 1 | 2 | ••• | 40 | 41 | 0 | 1 | 2 | ••• | 40 | 41 |
| SG #1 sequential write (IOPS) | 0 | 1 | 2 | ••• | 40 | 41 | 0 | 1 | 2 | ••• | 40 | 41 |
| SG #1 sequential write (MBPS) | 0 | 1 | 2 | ••• | 40 | 41 | 0 | 1 | 2 | ••• | 40 | 41 |
| SG#2 | 0 | 1 | 2 | ••• | 40 | 41 | 0 | 1 | 2 | ••• | 40 | 41 |
| ••• | | | | | | | | | | | | |
| SG#N | 0 | 1 | 2 | ••• | 40 | 41 | 0 | 1 | 2 | ••• | 40 | 41 |

SG#1

Front-end results

Back-end – Heterogeneous drive technologies

Back-end – Homogenous drive technologies

RDF ports

RDF directors

RESOLVING CAPACITY RECOVERY ACROSS MULTIPLE COMPONENTS OF A STORAGE SYSTEM

FIELD

This disclosure relates to computing systems and related devices and methods, and, more particularly, to a method and apparatus for resolving capacity recovery across multiple components of a storage system in connection with simulated removal of a storage group from the storage system.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

Workload from a host or a set of hosts is directed to a set of storage volumes that are formed from storage resources that are grouped together in a storage group on a storage system. The workload on the storage group impacts many components of the storage system, including front-end ports and directors, shared global memory, back-end ports and directors, and back-end storage resources. The workload may also affect systems applications such as remote data forwarding (RDF) applications that also consume storage system resources such as RDF ports and directors and shared global memory. A workload planner characterizes workloads on the storage groups and overall workloads on components of the storage system, and contains control logic configured to resolve capacity recovery across multiple components of a storage system in connection with simulated removal of the storage group from the storage system.

In some embodiments, a system for resolving capacity recovery across a plurality of components of a storage system in connection with simulated removal of one storage group of a set of storage groups from the storage system, includes one or more computers and one or more storage devices storing instructions that are operable, when executed by the one or more computers, to cause the one or more computers to perform operations includes maintaining a storage system component Key Performance Index (KPI) data structure containing a plurality of KPI values for each of the storage system components, maintaining a storage group KPI data structure containing a plurality of KPI values for each storage group of the set of storage groups of the storage system, and using the storage system KPI values and storage group KPI values for the one storage group of the set of storage groups to simulating removal of the one storage group of the set of storage groups from each of the plurality of components of the storage system, the plurality of components of the storage system including a set of front-end ports of the storage system, a set of front-end directors of the storage system, a set of back-end ports of the storage system, a set of back-end directors of the storage system, and a shared global memory of the storage system.

In some embodiments, simulating removal of the one storage group of the set of storage groups on the set of front-end ports of the storage system includes identifying a relevant set of front-end ports for the storage group, obtaining a time series of overall workload bandwidth values for each front-end port of the relevant set of front-end ports, the overall workload bandwidth values being specified as numbers of bytes per second, determining a workload ratio for each front-end port of the relevant set of front-end ports from the time series overall workload bandwidths values, determining the storage group workload bandwidth for the storage group, the storage group workload bandwidth being a subset of the overall workload bandwidth for the identified relevant set of front-end ports and being specified as numbers of bytes per second, and removing the storage group workload bandwidth from each front-end port of the relevant set of front-end ports according to the determined respective workload ratio for the respective front-end port.

In some embodiments, identifying the relevant set of front-end ports includes identifying all front-end ports that are in a port group in a masking view associated with the storage group, and that are also zoned to an initiator in an initiator group associated with the masking view.

In some embodiments, determining the workload ratio for each front-end port of the relevant set of front-end ports includes summing the overall workload bandwidth values for each front-end port of the relevant set of front-end ports during each time slot of the time series, and dividing each respective overall workload bandwidth value for each respective front-end port of the relevant set of front-end ports by the sum of the overall workload bandwidth values during each slot of the time series.

In some embodiments, a first subset of the plurality of KPI values contained in the storage system component Key Performance Index (KPI) data structure include the time series overall workload bandwidth values for each front-end port of the relevant set of front-end ports, the overall workload bandwidth values being specified as numbers of bytes per second.

In some embodiments, simulating removal of the one storage group of the set of storage groups on the set of front-end directors of the storage system includes identifying a set of relevant front-end directors where the front-end ports of the relevant set of front-end ports for the storage group are located, determining which front-end ports of the relevant set of front-end ports are located on each relevant front-end director, obtaining time series number of storage group IO operations per second implemented by the storage group, allocating proportions of storage group IO operations per second to each front-end port of relevant set of front-end ports according to the workload ratios for each front-end port of the relevant set of front-end ports, determining overall IO operations per second for each front-end director of the set of relevant front-end directors, and removing the allocated proportion of storage group IO operations per second from each relevant front-end director according to the locations of the front-end ports. In some embodiments, the overall IO operations per second for each respective front-end director is reduced by removing the allocated portion of storage group IO operations of each front-end port that is located on the respective front-end director.

In some embodiments, simulating removal of the one storage group of the set of storage groups on the set of back-end ports and set of back-end directors of the storage system includes determining that the set of back-end ports and set of back-end directors are connected to heterogeneous storage devices implementing a tiered storage array, running a tiered storage placement simulation to create a skew chunk mapping, each skew chunk representing an input/output (IO) density on a particular slice of data, the skew chunk mapping assigning the skew chunks of data into tiers of the tiered back-end storage array, the skew chunks of data including data of the storage group as well as data of the other storage groups of the set of storage groups, generating current back-end port and back-end director utilization values based on the skew chunk mapping, removing the skew chunks associated with the storage group, re-running the tiered storage placement simulation to create a revised skew chunk mapping, generating revised back-end port and back-end director utilization values based on the revised skew chunk mapping, and comparing the current back-end port and back-end director utilization values with the revised back-end port and back-end director utilization values.

In some embodiments, the tiered storage placement simulation identifies parts of workloads that have different IO densities and allocates skew chunks with higher IO densities to a higher performing storage tier and allocates skew chunks with lower IO densities to a lower performing storage tier.

In some embodiments, a first subset of the back-end ports and a first subset of the back-end directors are used to handle IO transactions on the higher performing storage tier, and a second subset of the back-end ports and a second subset of the back-end directors are used to handle IO transactions on the lower performing storage tier.

In some embodiments, simulating removal of the one storage group of the set of storage groups on the set of back-end ports and set of back-end directors of the storage system includes determining that the set of back-end ports and set of back-end directors are connected to homogeneous storage devices implementing a storage array, obtaining a bucketized workload bandwidth for the set of back-end ports and bucketized IO operation values for the back-end directors, calculating a current growth factor for the storage system, the current growth factor representing how much more of the existing storage system workload can be added to the storage system without exceeding best practices threshold values for the set of back-end ports and set of back-end directors, removing the storage group workload from the bucketized workload bandwidth for the set of back-end ports and removing the storage group IO operations from the bucketized IO operation values for the back-end directors, calculating a revised growth factor for the storage system, the revised growth factor representing how much more storage system workload can be added to the storage system with the workload of the storage group removed, without exceeding best practices threshold values for the set of back-end ports and set of back-end directors, and comparing the current back-end port growth factor and back-end director growth factor values with the revised back-end port growth factor and back-end director growth factor values.

In some embodiments, comparing current back-end port growth factor and back-end director growth factor values with the revised back-end port growth factor and back-end director growth factor values includes inverting the current back-end port growth factor and the back-end director growth factor to obtain a current back-end port utilization value and a current back-end director utilization value, inverting the revised back-end port growth factor and the back-end director growth factor to obtain a revised back-end port utilization value and a revised back-end director utilization value, comparing the current back-end port utilization value with the revised back-end port utilization value, and comparing current back-end director utilization value with the revised back-end director utilization value.

In some embodiments, simulating removal of the one storage group of the set of storage groups on the shared global memory of the storage system includes determining usage characteristics of shared global memory, calculating a current bucketized shared global memory utilization value from the usage characteristics, obtaining bucketized storage group write IO operation data, removing the bucketized storage group write IO operation data from the usage characteristics to create revised usage characteristics, calculating a revised bucketized shared global memory utilization value from the revised usage characteristics.

In some embodiments, the usage characteristics are based on write pending counters, remote data forwarding counters, a write pending limit, and a growth factor, and in some embodiments, the bucketized storage group write IO operation data includes bucketized write hit, write miss, and sequential write values.

In some embodiments, the plurality of components of the storage system further include a set of Remote Data Forwarding (RDF) ports and a set of RDF directors, and simulating removal of the one storage group of the set of storage groups on the set of RDF ports of the storage system includes determining that the one storage group is participating in an RDF session in which write operations to the storage group are mirrored on the RDF session to a peer storage system, in response to determining that the one storage group is participating in the RDF session, identifying a relevant set of RDF ports for the storage group, obtaining a time series of overall workload bandwidth values for each RDF port of the relevant set of RDF ports, the overall workload bandwidth values being specified as numbers of bytes per second, determining a workload ratio for each RDF port of the relevant set of RDF ports from the time series overall workload bandwidths values, determining the storage group workload bandwidth for the storage group, the storage group workload bandwidth being a subset of the overall workload bandwidth for the identified relevant set of RDF ports and being specified as numbers of bytes per second, and removing the storage group workload bandwidth from each RDF port of the relevant set of front-end ports according to the determined respective workload ratio for the respective front-end port.

In some embodiments, identifying the relevant set of RDF ports includes identifying all RDF ports that are in a port group used to implement the RDF session for the storage group.

In some embodiments, determining the workload ratio for each RDF port of the relevant set of RDF ports includes summing the overall workload bandwidth values for each RDF port of the relevant set of RDF ports during each time slot of the time series, and dividing each respective overall workload bandwidth value for each respective RDF port of the relevant set of RDF ports by the sum of the overall workload bandwidth values during each slot of the time series.

In some embodiments, a first subset of the plurality of KPI values contained in the storage system component Key Performance Index (KPI) data structure include the time series overall workload bandwidth values for each RDF port of the relevant set of RDF ports, the overall workload bandwidth values being specified as numbers of bytes per second.

In some embodiments, simulating removal of the one storage group of the set of storage groups on the set of RDF directors of the storage system includes identifying a set of relevant RDF directors where the RDF ports of the relevant set of RDF ports for the storage group are located, determining which RDF ports of the relevant set of RDF ports are located on each relevant RDF director, obtaining time series number of storage group IO write operations per second implemented by the storage group, allocating proportions of storage group IO write operations per second to each RDF port of relevant set of RDF ports according to the workload ratios for each RDF port of the relevant set of RDF ports, determining overall IO operations per second for each RDF director of the set of relevant RDF directors, and removing the allocated proportion of storage group IO operations per second from each relevant RDF director according to the locations of the RDF ports. In some embodiments the overall IO operations per second for each respective RDF director is reduced by removing the allocated portion of storage group write IO operations of each RDF port that is located on the respective RDF director.

BRIEF DESCRIPTION OF THE DRAWINGS

FIG. 3 is a diagram of an example storage system component Key Performance Index (KPI) data structure maintained by the workload planner of FIG. 2, according to some embodiments.

FIG. 4 is a diagram of an example storage group KPI data structure maintained by the workload planner of FIG. 2, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms “logical” and “virtual” are used to refer to features that are abstractions of other features, e.g., and without limitation, abstractions of tangible features. The term “physical” is used to refer to tangible features, including but not limited to electronic hardware. For example, multiple virtual computing devices could operate simultaneously on one physical computing device. The term “logic” is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
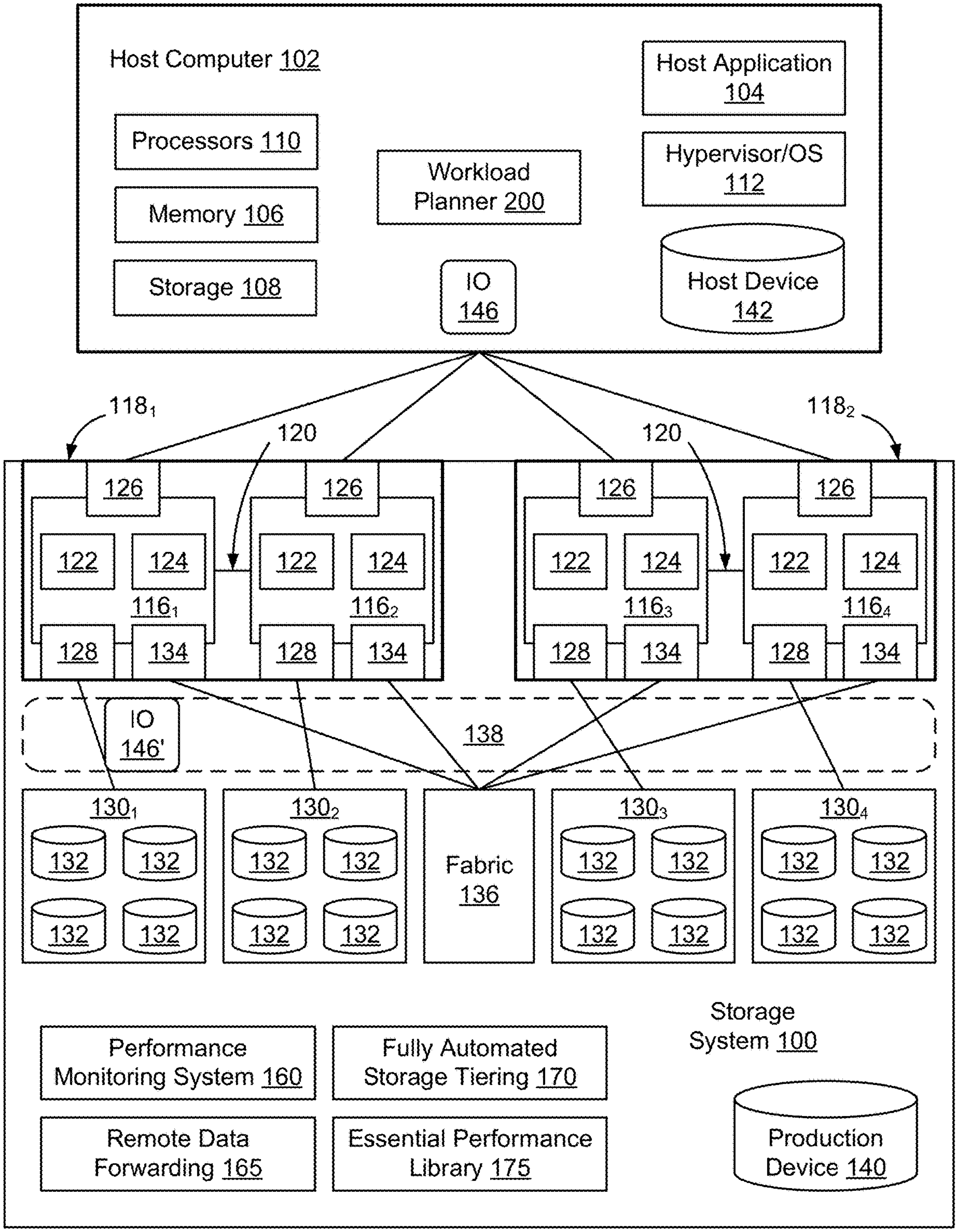
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (operating system) 112. The processors 110 may include one or more multi-core processors that include multiple CPUs, GPUs, and combinations thereof. The host volatile memory 106 may include RAM (Random Access Memory) of any type. The persistent storage 108 may include tangible persistent storage components of one or more technology types, for example and without limitation Solid State Drives (SSDs) and Hard Disk Drives (HDDs) of any type, including but not limited to SCM (Storage Class Memory), EFDs (enterprise flash drives), SATA (Serial Advanced Technology Attachment) drives, and FC (Fibre Channel) drives. The host computer

102 might support multiple virtual hosts running on virtual machines or containers. Although an external host computer 102 is illustrated in FIG. 1, in some embodiments host computer 102 may be implemented in a virtual machine within storage system 100.

The storage system 100 includes a plurality of compute nodes 116$_1$-116$_4$, possibly including but not limited to storage servers and specially designed compute engines or storage directors for providing data storage services. In some embodiments, pairs of the compute nodes, e.g. (116$_1$-116$_2$) and (116$_3$-116$_4$), are organized as storage engines 118$_1$ and 118$_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines 118$_1$ and 118$_2$, which has a pair of (two independent) compute nodes, e.g. (116$_1$-116$_2$) or (116$_3$-116$_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, 116$_1$, 116$_2$, 116$_3$, 116$_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front end adapters 126 for communicating with the host computer 102. Each compute node 116$_1$-116$_4$ may also include one or more back-end adapters 128 for communicating with respective associated back end drive arrays 130$_1$-130$_4$, thereby enabling access to managed drives 132.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using Non-Volatile Memory (NVM) media technologies, such as NAND-based flash, or higher-performing Storage Class Memory (SCM) media technologies such as 3D XPoint and Resistive RAM (ReRAM). Managed drives 132 may be directly connected to the compute nodes 116$_1$-116$_4$, using a PCIe bus or may be connected to the compute nodes 116$_1$-116$_4$, for example, by an InfiniBand (IB) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g., via Direct Memory Access (DMA) or Remote Direct Memory Access (RDMA).

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (logical block addresses) on which data used by the host application 104 resides and can be stored. However, the data used by the host application 104 and the storage resources available for use by the host application 104 may actually be maintained by the compute nodes 116$_1$-116$_4$ at non-contiguous addresses (tracks) on various different managed drives 132 on storage system 100.

In some embodiments, the storage system 100 maintains metadata that indicates, among various things, mappings between the production device 140 and the locations of extents of host application 104 data in the virtual shared global memory 138 and the managed drives 132. In response to an IO (input/output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

There may be multiple paths between the host computer 102 and the storage system 100, e.g., one path per front end adapter 126. The paths may be selected based on a wide variety of techniques and algorithms including, for context and without limitation, performance and load balancing. In the case where IO 146 is a read command, the storage system 100 uses metadata to locate the commanded data, e.g., in the virtual shared global memory 138 or on managed drives 132. If the commanded data is not in the virtual shared global memory 138, then the data is temporarily copied into the virtual shared global memory 138 from the managed drives 132 and sent to the host application 104 via one of the compute nodes 116$_1$-116$_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132. The virtual shared global memory 138 may enable the production device 140 to be reachable via all of the compute nodes 116$_1$-116$_4$ and paths, although the storage system 100 can be configured to limit use of certain paths to certain production devices 140 (zoning).

A data center may have numerous storage systems. Hosts are assigned to execute on one or more of the storage systems and generate workload on the storage systems. In some embodiments, workload from a host or a set of hosts is directed to a set of storage volumes that are formed from storage resources that are grouped together in a storage group. The workload on the storage group impacts front-end ports, the directors that are connected to the front-end ports, shared global memory, back-end ports and directors, and back-end storage resources. The workload can also consume resources of system applications. For example, in instances where the storage group is protected by a remote data forwarding (RDF) process that causes data contained in the storage group to be mirrored to a second storage system, the workload on the storage group may also impact RDF ports and directors, as well as increase the impact of the storage group workload on shared global memory.

When a storage group is to be removed from a storage system, for example to move the storage group to a different storage system, or when a storage system is reconfigured such as by reconfiguring a port group for a storage group or moving responsibility for the storage group to a new storage engine, the complex interrelationship of the components of the storage system make it difficult to determine with precision the effect that removal of the storage group will have on each of the components of the storage system. According to some embodiments, a method and apparatus for resolving capacity recovery across multiple components of a storage system is provided to enable the effect of simulated removal of the storage group from the storage system to be determined prior to removing the storage group from the storage system.

Figure 2:
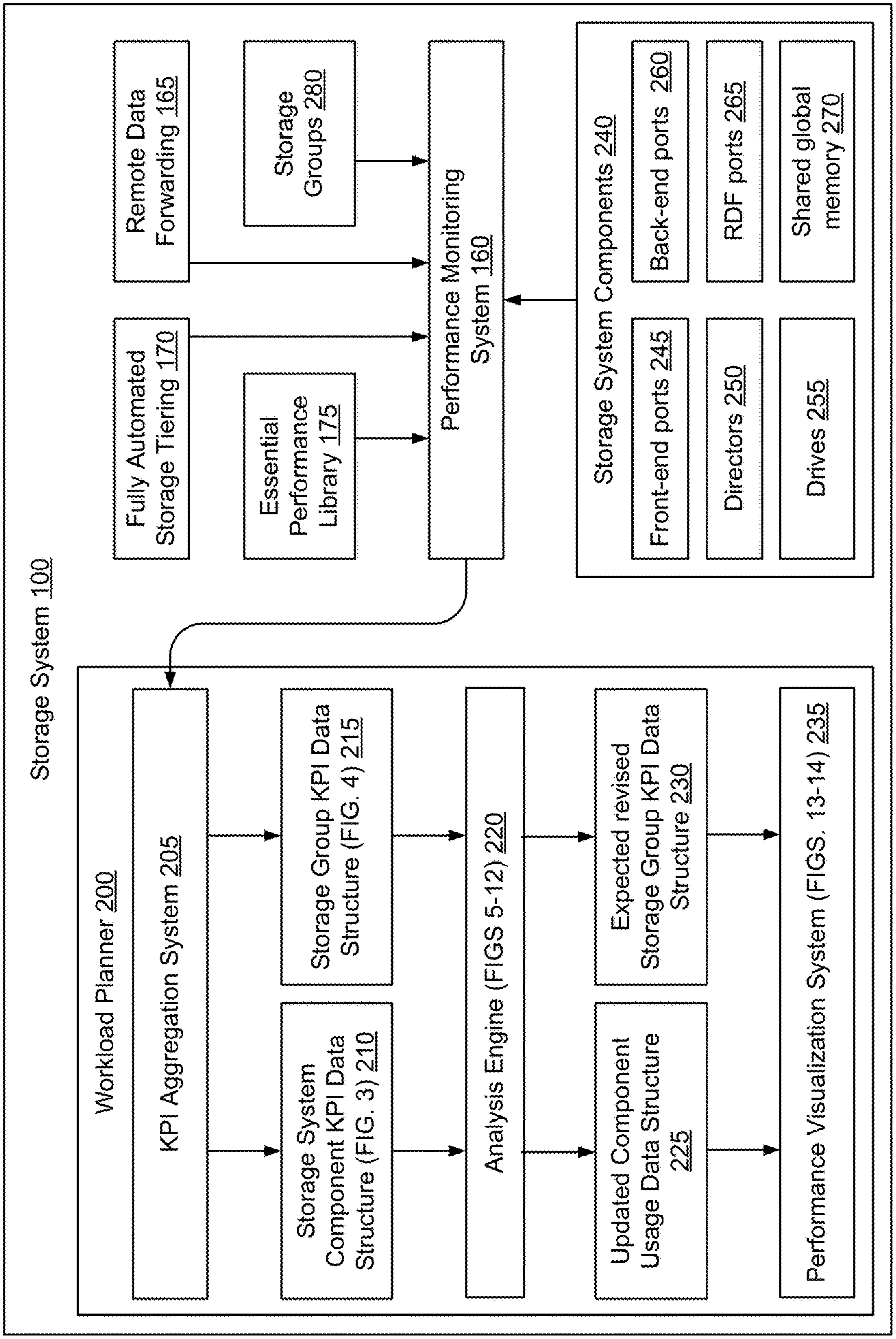
FIG. 2 is a functional block diagram of an example storage system with a performance monitoring system and a workload planner, according to some embodiments.

FIG. 2 is a functional block diagram of an example storage system with a performance monitoring system 160 and a workload planner 200, according to some embodiments. As shown in FIG. 2, in some embodiments the storage system includes a workload planner 200 which has a KPI aggregation system 205. A performance monitoring system 160 receives performance data from storage system components 240 and other systems of the storage system. Example storage system components 240 include front-end ports 245, directors 250, drives 255, back-end ports 260, RDF ports 265, and shared global memory 270. The performance monitoring system 160 may also monitor other system components depending on the implementation. The performance monitoring system 160 also receives performance data from system components, such as Fully Automated Storage Tiering (FAST) process 170, remote data forwarding process 165, essential performance library 175, and performance information specific to storage groups 280.

Performance monitoring system 160 periodically reports performance data to Key Performance Indicator (KPI) aggregation system 205. The KPI aggregation system 205 monitors a subset of the key KPI indicators that are used to create performance characterizations of the storage system components 240 and storage group workloads 280. In some embodiments, two weeks of data is condensed in such a way so as to minimize the amount of data required, but to maintain a representative shape of how the workload changes over time. In some embodiments, the workload planner 200 uses two weeks of performance data for calculations, but retains six weeks of performance data for historical/debugging purposes. Additional information regarding the KPI aggregation system 205 is described in U.S. Pat. No. 11,294,584, entitled Method and Apparatus for Automatically Resolving Headroom and Service Level Compliance Discrepancies, the content of which is hereby incorporated herein by reference.

The KPI aggregation system 205 compiles the KPI data to populate component KPI data structure 210 and storage group KPI data structure 215. An example component KPI data structure 210 is discussed in greater detail in connection with FIG. 3. An example storage group KPI data structure 215 is discussed in greater detail in connection with FIG. 4. As shown in FIGS. 3 and 4, in some embodiments the KPI aggregation system 205 distills reported KPI information from the performance monitoring system 160 into a set of 42 four-hour buckets, in which each bucket contains a weighted average KPI value for the respective four-hour interval. Using 42 four-hour interval buckets enables the KPI aggregation system 205 to characterize the fluctuation of a given KPI value over the course of a week.

As shown in FIG. 2, in some embodiments the workload planner 200 includes an analysis engine 220. The analysis engine 220, in some embodiments, contains control logic configured to resolve capacity recovery effects across multiple components of the storage system, in connection with removal of one or more of the storage groups 280 from the storage system 100. Additional details associated with the manner in which the analysis engine operates to resolve capacity recovery effects on several of the components of the storage system 100 are provided in greater detail in connection with FIGS. 5-12. Although FIGS. 5-12 describe a scenario in which removal of a single storage group from a storage system is simulated, it should be understood that simultaneous removal of multiple storage groups (but fewer than all of the storage groups) from a storage system may be similarly simulated, and the analysis engine 220 may be used to resolve capacity recoveries associated with the simulated simultaneous removal of multiple storage groups. The analysis engine 220 may also be used to resolve capacity recoveries associated with the simulated sequential removal of multiple storage groups.

In some embodiments, the analysis engine 220 resolves the capacity recovery values for the components and uses the capacity recovery values to generate an updated component usage data structure 225. In some embodiments the updated component usage data structure 225 has the same structure as the component KPI data structure 210 shown in FIG. 3, but with updated values showing the component KPI values with the workload associated with the storage group or set of storage groups removed.

Optionally, in some embodiments the analysis engine 220 of the workload planner 200 also generates an updated storage group KPI data structure 230 containing expected revised KPI values for the storage groups that remain on the storage system 100 after removal of the one or more selected storage groups. For example, in instances where a front-end port is overloaded, and removal of the workload associated with the storage group from the front-end port causes the front-end port to no longer be overloaded, the workloads associated with other storage groups may be positively affected. In some embodiments, the analysis engine is configured to populate the updated storage group KPI data structure 230 with revised KPI values in connection with resolving capacity recovery across multiple components of the storage system in connection with removal of one or more storage groups from the storage system.

Figure 13:
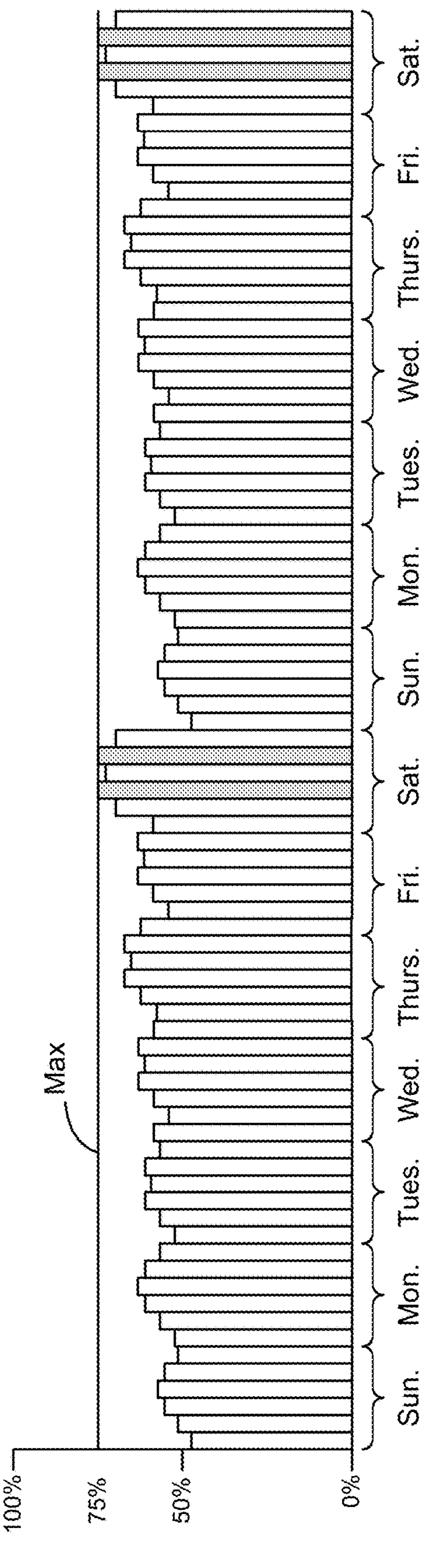
FIGS. 13 and 14 are graphs showing example hypothetical fluctuations of an example component utilization of a component on a storage system over a two-week period of time, prior to removal of a workload associated with a selected storage group from the storage system (FIG. 13), and after removal of the workload associated with the selected storage group from the storage system (FIG. 14).
Figure 14:
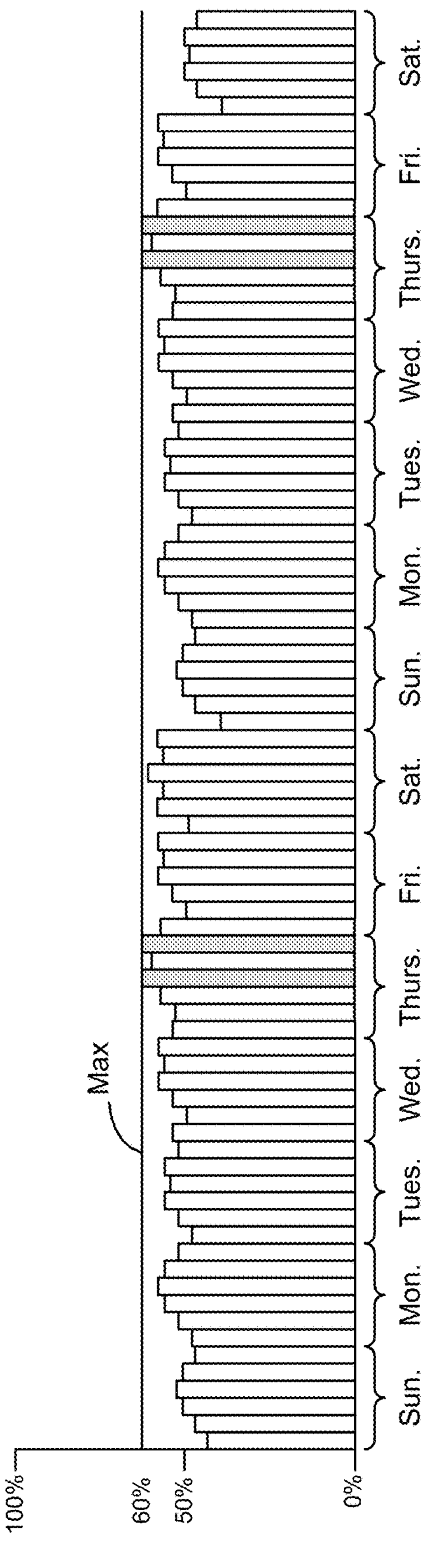

In some embodiments, the workload planner 200 includes a performance visualization system 235. An example visualization of the a component utilization prior to removal of a storage group and the expected utilization of the component after removal of a storage group is shown in FIGS. 13 and 14. It should be understood that there are many ways that the resolved capacity recoveries may be visualized, and the graphs shown in FIGS. 13 and 14 are merely one example. When the workload planner simulates removal of a storage group from the storage system, the performance visualization system enables the capacity recovery results to be presented to enable the impact of removing the storage group from the storage system to be understood in the context of the overall workload of the storage system.

As FIG. 3 is a diagram of an example storage system component Key Performance Index (KPI) data structure 210 maintained by the workload planner 200 of FIG. 2, according to some embodiments. As described in connection with FIG. 1, when a host issues an IO operation on a storage system, multiple components of the storage system are used to process the IO operation. For example, the IO may consume resources of one or more of the front-end ports, consume resources of one or more of the directors, may require allocation of one or more slots of shared global memory, and may also consume resources of back-end directors, back-end ports, and drives. As shown in FIG. 3, in some embodiments the component KPI data structure 210 contains bucketized entries containing KPI values for each of the multiple components that will be processed in connection with resolving capacity recovery across the multiple components of the storage system 100. Although a particular selection of KPI values is shown in FIG. 3, it should be understood that the component KPI data structure 210 may contain multiple additional entries depending on the implementation.

In the example shown in FIG. 3, the component KPI data structure 210 contains a set of bucketized entries for the time-average front-end port usage in megabits per second (MBPS). The component KPI data structure 210 also contains a set of bucketized entries for the front-end port utilization values. The component KPI data structure 210 also contains a set of bucketized entries for the time-average director usage specified as the average number of IO operations per second (IOPS) handled by the respective director during each of the four-hour buckets. The component KPI data structure 210 also contains a set of bucketized entries for the director utilization values.

In some embodiments, the front-end port utilization values and the director utilization values are calculated by the essential performance library process 175. The utilization value specifies a percentage value that represents how much workload a particular component is handling, as compared to a best practices maximum value for the particular component. Based on the component utilization values retrieved from the essential performance library 175, the workload planner 200 is able to calculate maximum IOPS values for the directors and maximum MBPS values for the front-end ports by dividing the total IOPS/MBPS values for a given director/port by the associated utilization.

In some embodiments, the component KPI data structure 210 contains a set of bucketized entries characterizing usage of back-end resources, such as back-end port usage values (MBPS), and back-end port utilization values. The component KPI data structure 210 may also contain back-end director usage and utilization values depending on the implementation.

In some embodiments, the component KPI data structure 210 contains a set of bucketized entries characterizing usage of shared global memory. Example KPI values might include write pending slot use counters and RDFA slot use counters, although other ways of characterizing usage of shared global memory may be used as well.

In some embodiments, the component KPI data structure 210 includes other KPI values, such as a growth factor calculated by the essential performance library process 175. The "growth factor" as described in greater detail herein, in some embodiments is a factor describing an amount of additional workload that can be added to a storage system 100 without surpassing a system component's "best practice" performance threshold. The higher the growth factor, the more workload can be accepted by the storage system. By taking the inverse of the growth factor, it is possible to determine the overall utilization of a particular system component. In some embodiments, for example as discussed in greater detail in connection with back-end drives, the growth factor is calculated by the essential performance library 175.

FIG. 4 is a diagram of an example storage group KPI data structure 215 maintained by the workload planner 200 of FIG. 2, according to some embodiments. As shown in FIG. 4, in some embodiments the storage group KPI data structure 215 includes a plurality of bucketized entries characterizing each storage group workload. In FIG. 4, the selected KPI data for each storage group includes read hits, which is characterized using both the bucketized average number of IO operations per second (IOPS) as well as the average usage value in megabytes per second (MBPS). The example storage group KPI data structure 215 also contains entries for read miss (both IOPS and MBPS), write hit (both IOPS and MBPS), write miss (both IOPS and MBPS), sequential read (both IOPS and MBPS), and sequential write (both IOPS and MBPS). As described more fully in connection with FIGS. 5-12, different types of read and write operations may consume resources of different sets of components of the storage system 100 and, accordingly, by maintaining granular KPI information in the storage group KPI data structure 215 for each of the storage groups 280, it is possible to more accurately resolve capacity recovery across multiple components of the storage system in connection with removal of one or more of the storage groups from the storage system. Although FIG. 4 only shows a detailed set of KPI entries for storage group #1 (SG #1) it should be understood that the storage group KPI data structure 215 contains a similar set of entries for each of the other storage groups #2-#N. Additionally, although FIG. 4 shows a particular selection of KPI values, it should be understood that additional KPI values may be maintained in the storage group KPI data structure 215 depending on the implementation.

Figure 5:
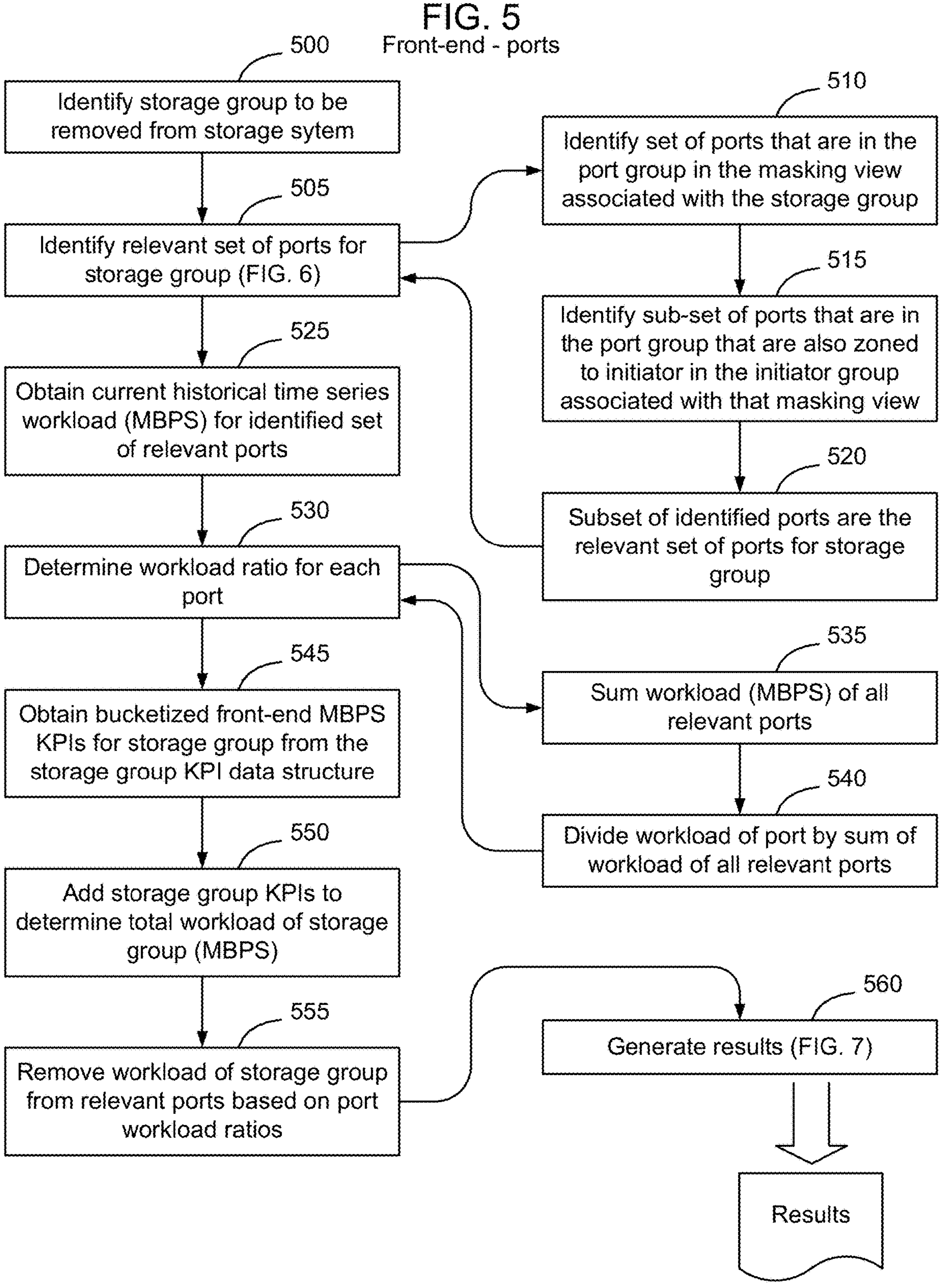
FIG. 5 is a flow chart of an example method of resolving capacity recovery of front-end ports of a storage system upon removal of a storage group from the storage system, according to some embodiments.

FIG. 5 is a flow chart of an example method of resolving capacity recovery of front-end ports of a storage system upon removal of a storage group from the storage system, according to some embodiments. As shown in FIG. 5, initially a storage system is identified to be removed from a storage system (block 500). In some embodiments the storage group is identified in advance of actually removing the storage group from the storage system, and the process shown in FIG. 5 is used to resolve the amount of capacity that would be recovered from the front-end ports of the storage system if the storage group were to be removed from the storage system. Although FIG. 5 shows some embodiments in which a single storage group is selected to be removed from the storage system in block 500, it should be understood that multiple storage groups (but fewer than all of the storage groups) may be selected in block 500. Alternatively, the process shown in FIG. 5 may be iterated with multiple storage groups to determine the effect of removing different storage groups from the front-end ports of the storage system. In instances where particular ports are overloaded, resolving capacity recovery associated with removing particular storage groups to determine the impact on the particular ports may be advantageous to select a particular storage group or set of storage groups that will have the greatest impact on reducing the overloaded condition of the particular ports.

Once a storage group or set of storage groups is selected (block 500) a relevant set of ports that are used to service IO operations on the storage group are identified (block 505). In some embodiments, to identify a set of relevant ports for the storage group, the workload planner 200 identifies a set of ports that are in the port group in the masking view associated with the storage group (block 510). Within that set of ports, a subset of ports is then identified that are in the port group and that are also zoned to an initiator in the initiator group associated with the masking view (block 515). The subset of identified ports are the relevant set of ports for the storage group (block 520).

Once the relevant ports are identified (block 505), the workload planner 200 obtains the current historical time series workload (MBPS) for the identified set of relevant ports from the component KPI data structure 210 (block 525). The workload planner 200 then determines the workload ratio for each port in the set of relevant ports (block 530). In some embodiments, determining the workload ratio for each port in the set of relevant ports is implemented by summing the workload (MBPS) of the workloads of all of the relevant ports (denominator) (block 535), and dividing the workload of each particular port (numerator) by the sum of all of the workloads (block 540). For example, if there are two relevant ports and the workload on the first port is 400 MBPS, and the workload on the second port is 600 MBPS, the sum of all workloads is 1000 MBPS. The ratio of workloads is thus 40% for the first port (400 MBPS/1000 MBPS) and the ratio of the workload for the second port is 60% (600 MBPS/1000 MBPS). Since the workloads on the set of relevant ports are bucketized values, in some embodiments the workload ratios are calculated for each of the time series bucketized values.

The workload planner 200 also obtains the bucketized front-end MBPS KPIs for the storage group from the storage group KPI data structure 215 (block 545). In some embodiments the workload planner 200 then determines a sum of the KPI values of the storage group (MBPS) (block 550). As shown in FIG. 4, in some embodiments the KPI values that are expressed in MBPS include the storage group read hit, storage group read miss, storage group write hit, storage group write miss, storage group sequential reads, and storage group sequential writes. In some embodiments the workload planner 200 sums these values for each of the buckets.

The workload planner 200 then removes the storage group workload values determined in block 550 from each of the ports according to the port workload ratios determined in block 530 (block 555). For example, if the set of relevant ports includes the first port having a workload ratio of 40%, and a second port having a workload ratio of 60%, the workload planner 200 removes 40% of the storage group total workload calculated in block 550 from the first port and removes 60% of the storage group total workload calculated in block 550 from the second port (block 555). For example, if the sum of the KPI values of the storage group calculated in block 550 is 80 MBPS, removal of the storage group would cause 32 MBPS to be reclaimed from the first port and 48 MBPS to be reclaimed from the second port.

The workload planner 200 generates the results for each of the buckets of the time series bucketized values for the front-end ports (block 560) which are then output. In some embodiments, the front-end impact on the front-end ports is determined by updating the utilization values of each of the relevant front-end ports, and dividing by the max MBPS values for the ports. In some embodiments the port utilization bucket with the highest utilization value prior to removal is compared with the bucket with the highest utilization value after removal to determine the amount of capacity recovery associated with removing the storage group from the storage system.

By identifying a set of relevant ports used by a storage group, and proportionately removing the time-series workload of the storage group from the time-series workloads of the set of relevant ports, it is possible to resolve the capacity recovery associated with removing the storage group from the storage system before the storage group is removed from the storage system. Removing front-end workload is relevant when removing a workload from a source array during a migration and when planning to reconfigure a port group. For example, when planning to reconfigure a port group, workload can be removed from overloaded ports before running an additive performance impact algorithm to simulate adding workload to new/more suitable ports.

Figure 6:
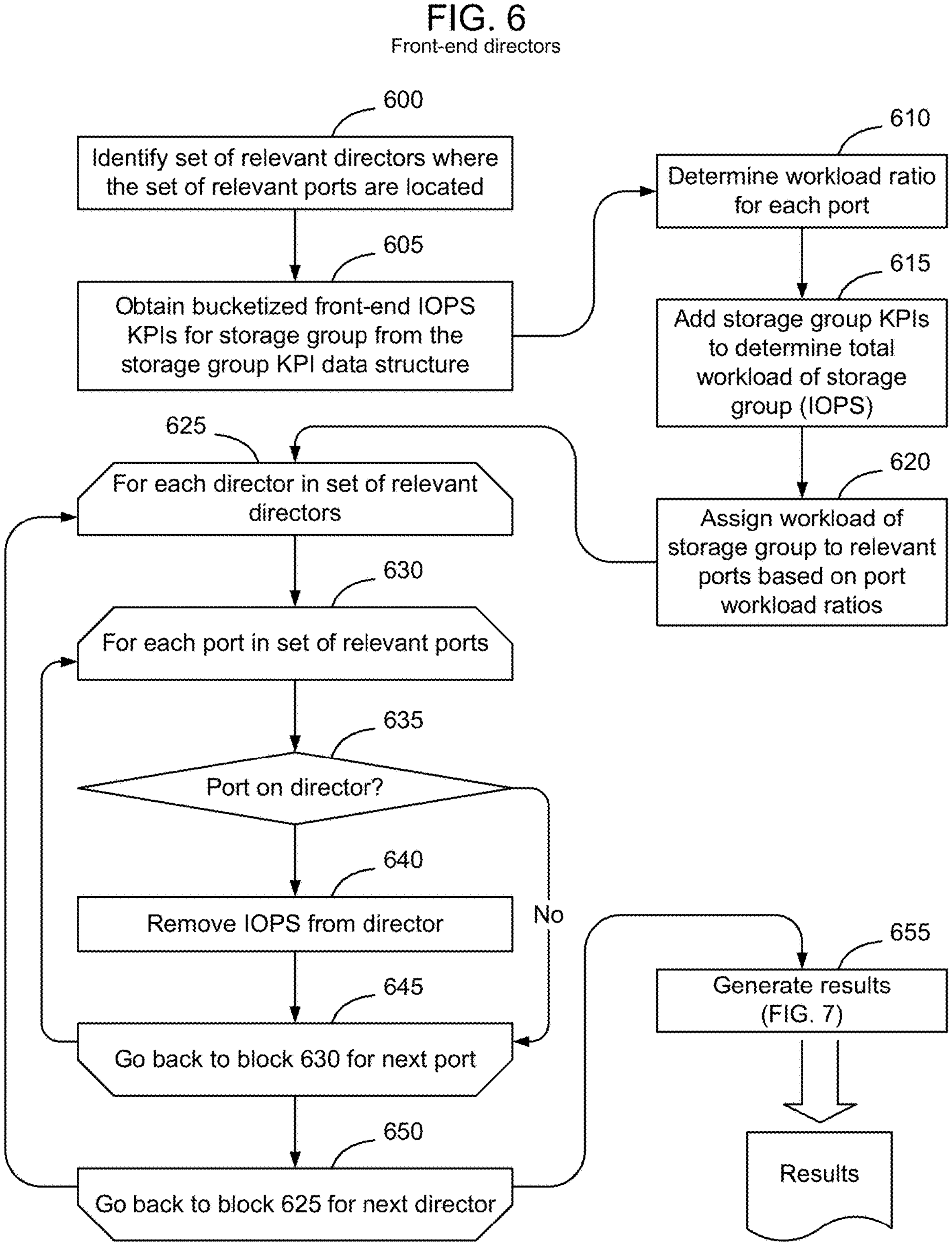
FIG. 6 is a flow chart of an example method of resolving capacity recovery of front-end directors of a storage system upon removal of a storage group from the storage system, according to some embodiments.

FIG. 6 is a flow chart of an example method of resolving capacity recovery of front-end directors of a storage system upon removal of a storage group from the storage system, according to some embodiments. As shown in FIG. 6, in some embodiments to resolve the capacity recovery on a set of directors, a set of relevant ports is determined (FIG. 5 block 505), and the location of the set of relevant ports is used to identify a set of relevant directors (block 600). Specifically, a set of relevant directors is a set of directors where the relevant ports are located.

In some embodiments, workload on a given director is characterized using a number of IO operations processed by the director per second (IOPS). To resolve an amount of capacity recovered from a director by removal of a storage group, the workload planner 200 then obtains the bucketized front-end IOPS KPI values for the storage group from the storage group KPI data structure 215 (block 605). In some embodiments, the workload planner 200 determines the workload ratio for each port (block 610), and adds the storage group KPIs to determine the total workload of the storage group (IOPS) (block 615). As shown in FIG. 4, in some embodiments the KPI values that are expressed in IOPS include the storage group read hit, storage group read miss, storage group write hit, storage group write miss, storage group sequential reads, and storage group sequential writes. In some embodiments the workload planner 200 sums these values for each of the buckets. The workload planner 200 then assigns the workload of the storage group to the relevant ports based on the port workload ratios (block 620). The workload ratios can be calculated using the process described in connection with FIG. 5, blocks 535-540.

The workload planner 200 resolves capacity recovery on the directors by removing the workload of the storage group based on where the front-end ports used by the storage group are located. For example, in some embodiments the workload planner 200 selects a first director (block 625), and a first of the relevant ports (block 630), and determines whether the selected port is on the selected director (block 635). If the port is on the director (a determination of YES at block 635) the workload planner 200 removes the storage group workload assigned to the port in block 620 from the selected director (block 640). If the port is not on the selected director (a determination of NO at block 635) the workload planner 200 moves to the next port. The process iterates until all relevant ports have been evaluated against the selected director. Once all ports have been evaluated against a selected director, the workload planner 200 returns to block 625 to select an a next director. This process iterates until all the workloads for all of the relevant ports allocated in block 620 have been removed from the relevant directors based on where the ports reside. Once the workloads of the relevant ports have been removed from the director workloads, the workload planner 200 generates results (block 655) which are output.

Figure 7:
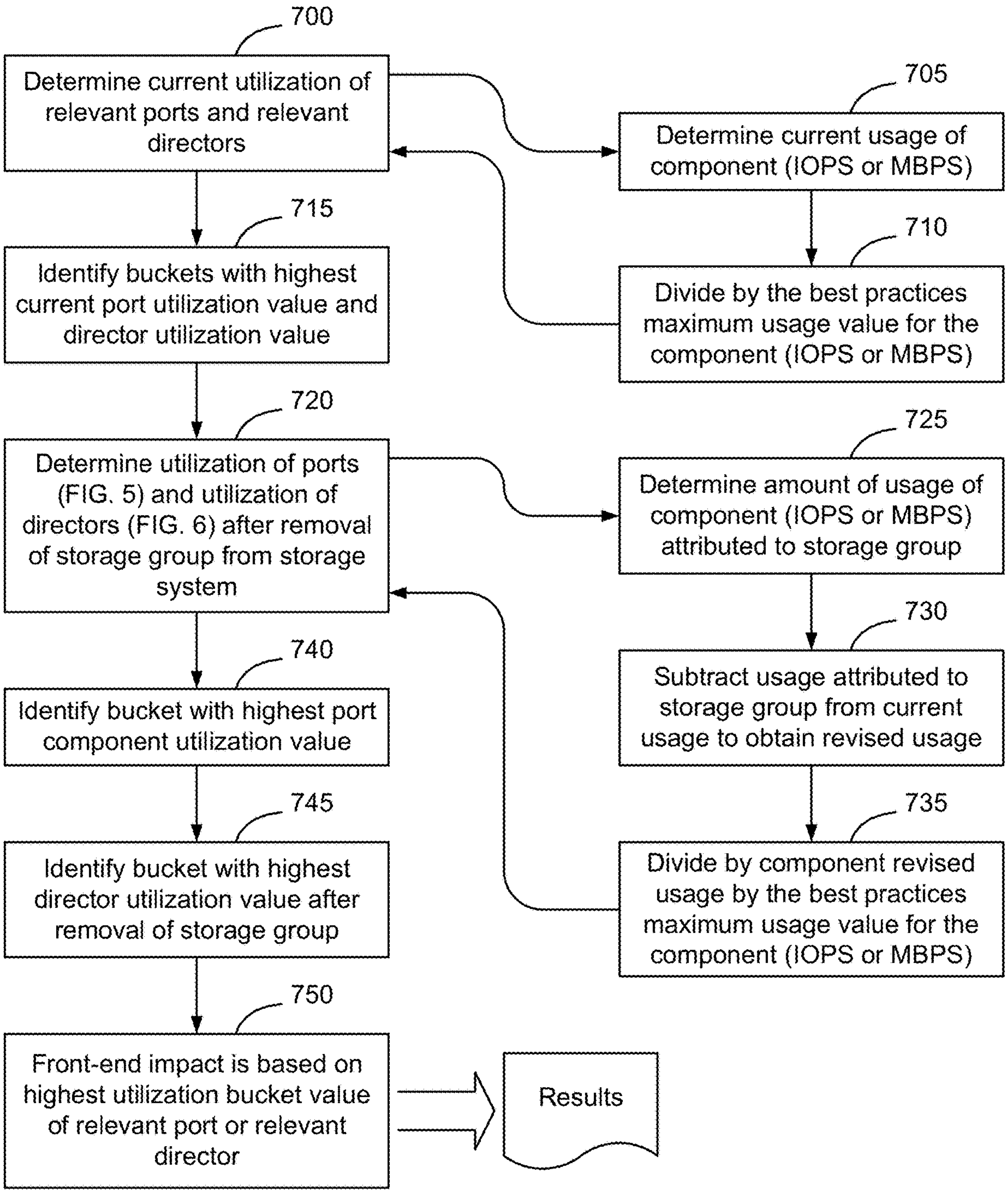
FIG. 7 is a flow chart of an example method of evaluating the resolved capacity recovery of front-end port and directors of a storage system upon removal of a storage group from the storage system, according to some embodiments.

FIG. 7 is a flow chart of an example method of evaluating the resolved capacity recovery of front-end port and directors of a storage system upon removal of a storage group from the storage system, according to some embodiments. As shown in FIG. 7, in some embodiments, to evaluate the resolved capacity recovery of the front-end components of the storage system, the workload planner 200 determines the current utilization values of the relevant front-end ports and relevant directors (block 700). Since ports that are not determined to be relevant ports (FIG. 5, block 505) and directors that are not determined to be relevant directors (FIG. 6, block 600) are not affected by removal of the storage group from the storage system, in some embodiments the workload planner 200 does not evaluate ports and directors that are not determined to be relevant ports and relevant directors.

As used herein, the term "utilization" is used to refer to a percentage usage value of a component based on a best practices maximum usage value for the component. For example, if a port has a maximum port speed of 1000 MBPS, and a best practices max maximum usage value of 500 MBPS, a port usage value of 400 MBPS would equate to an 80% utilization value (400 MBPS/500 MBPS=80%).

Accordingly, as shown in FIG. 7, in some embodiments the workload planner 200 determines the current usage of the component (MBPS for ports/IOPS for directors) (block 705) and divides the current usage by the best practices maximum usage value for the component (block 710). The workload planner 200 does this for each component for each bucket, and then identifies the buckets with the highest current port utilization values and buckets with the highest current director utilization values (block 715). The current utilization values of the front-end ports and directors are based on the respective highest current director utilization values of the front-end ports and directors in any of the buckets.

The workload planner 200 then determines the revised utilization values of the ports (see FIG. 5) and the revised utilization values of the directors (See FIG. 6) after removal of the storage group from the storage system. For example, in some embodiments the workload planner 200 uses the processes described in connection with FIGS. 5 and 6 to determine revised bucketized usage values for the front-end ports and front-end directors. For example, in some embodiments the workload planner 200 determines an amount of usage of a component (MBPS for ports/IOPS for directors) attributed to the storage group (block 725), subtracts the usage attributed to the storage group from the current usage of the component, to obtain the revised usage of the component (block 730). The workload planner 200 then divides the revised usage by the best practices maximum usage value for the component (block 735).

The workload planner 200 determines the revised utilization values for each component (port and director) for each bucket (block 740), and then identifies the buckets with the highest revised port utilization values and buckets with the highest revised director utilization values (block 745). In some embodiments, the front-end impact (capacity recovery) is based on a difference between the current highest utilization bucket value of the relevant port or relevant director and the revised highest utilization bucket value of the relevant port or relevant director (block 750).

There are many ways of calculating the capacity recovery, depending on the implementation. In some embodiments, the workload planner 200 determines the capacity recovery by looking at each component separately, and comparing a current maximum utilization with a revised maximum utilization. For example, if port A has an 80% current utilization in bucket #23, and a revised maximum utilization of 72% in bucket #12 after removal of the storage group, the workload planner 200 would return a result that removal of the storage group from the storage system would result in an 8% capacity recovery on Port A. In other embodiments, the workload planner 200 determines the capacity recovery by determining an average utilization across all buckets prior to removal of the storage group, determining an average utilization after removal of the storage group across all buckets, and comparing the current average utilization with the revised average utilization. In still other embodiments, the workload planner 200 determines a capacity recovery based on a largest difference in utilization values before and after removal of the storage group from the storage system. For example, if a storage group is configured to run backup operations on Saturday evening, which causes a large spike in both IOPS and MBPS to occur in bucket #41, removal of the storage group from the storage system may result in a large capacity recovery in bucket #41, which may be reported as the overall capacity recovery associated with removal of the storage group from the storage system. In some embodiments, the capacity recovery may be reported in multiple formats to enable removal of the storage group from the storage system to be evaluated using multiple metrics. Capacity recovery can be component specific, can be based on classes of components (e.g., separated into capacity recovery for front-end ports and capacity recovery for front-end directors), or can be an overall capacity recovery for the front-end system of the storage system, depending on the implementation.

When a storage group is removed from a storage system, the capacity recovery will also affect other parts of the storage system. For example, removal of the storage group will also affect shared global memory and backend components of the storage system.

Figure 8:
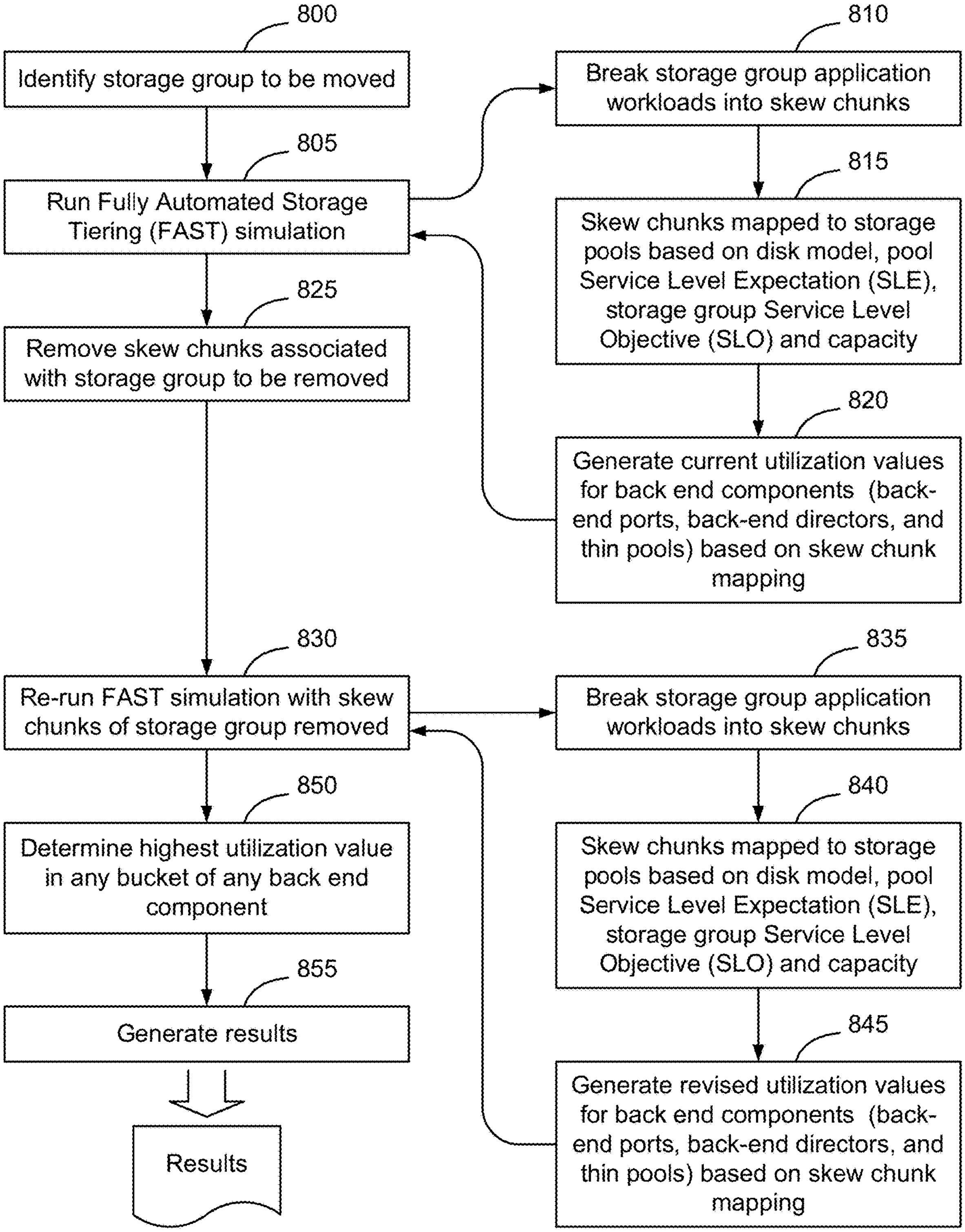
FIG. 8 is a flow chart of an example method of resolving capacity recovery of back-end systems of a storage system upon removal of a storage group from the storage system when the back-end drives of the storage system are implemented using heterogeneous drives, according to some embodiments.
Figure 9:
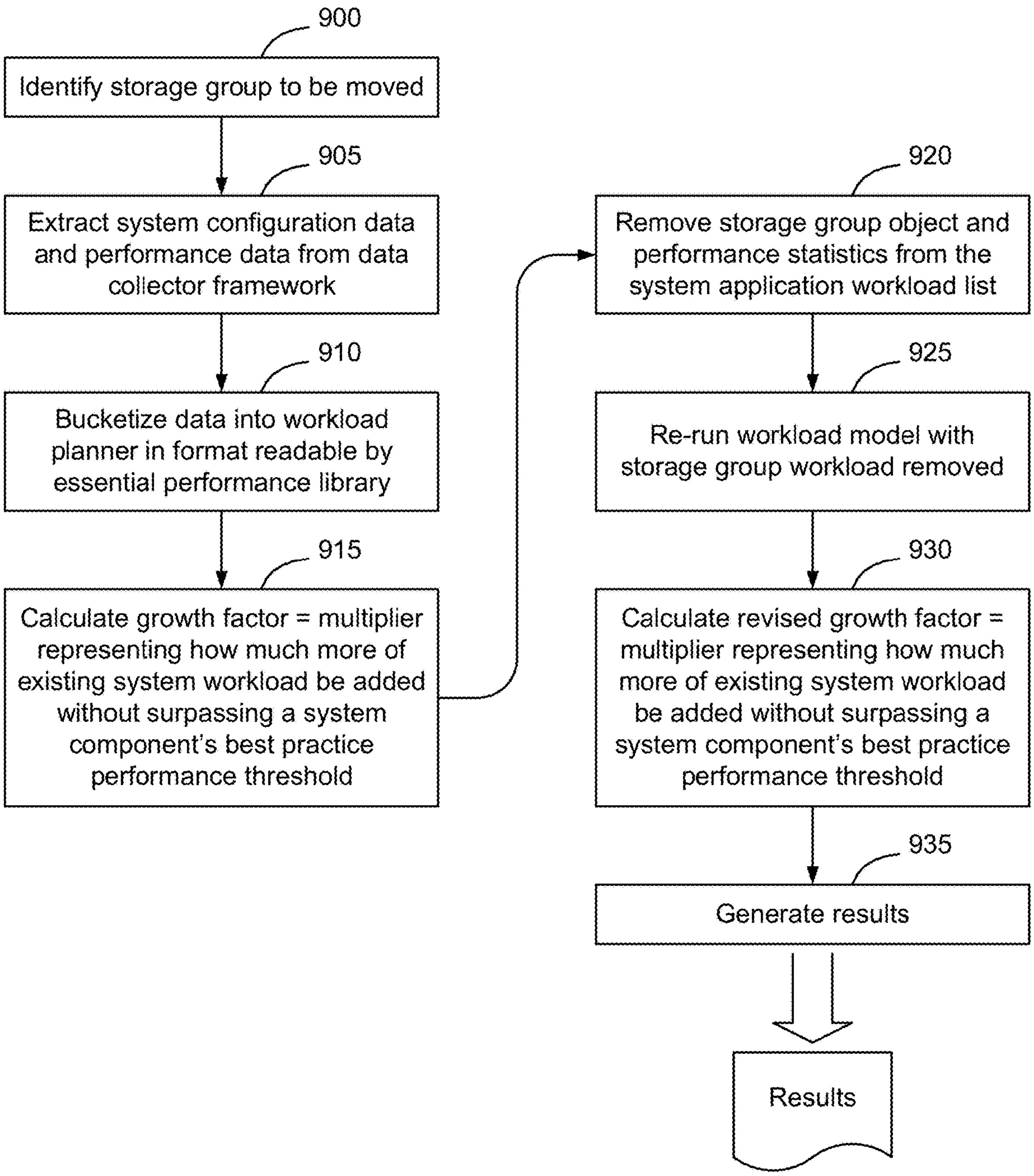
FIG. 9 is a flow chart of an example method of resolving capacity recovery of back-end systems of a storage system upon removal of a storage group from the storage system when the back-end drives of the storage system are implemented using homogeneous drives, according to some embodiments.

FIG. 8 is a flow chart of an example method of resolving capacity recovery of back-end systems of a storage system upon removal of a storage group from the storage system when the back-end drives are implemented using heterogeneous drives, according to some embodiments. FIG. 9 is a flow chart of an example method of resolving capacity recovery of back-end systems of a storage system upon removal of a storage group from the storage system when the back-end drives are implemented using homogeneous drives, according to some embodiments.

When the back-end storage resources are implemented using heterogeneous (different types of) drives, the different types of drives may have different speeds and, hence, be organized as storage tiers. For example, as shown in FIG. 2, in some embodiments the storage system has a fully automated storage tiering system 170 that is used to identify extents of data that are frequently accessed and put those extents of data into a higher performing storage tier of backend storage resources. Putting the more frequently accessed extents of data in higher performing storage resources enables the storage system to provide overall higher responsiveness. By contrast, in embodiments where all of the storage drives are the same (homogenous) or are designed to exhibit similar responsiveness, for example where the back-end storage resources are implemented using all flash drives, storage tiering may not be required since the drives used to implement the back-end storage resources are homogenous (all of the same type) and, hence, organizing the drives into storage tiers would result in less pronounced storage performance differentiation.

FIG. 8 shows an example method of resolving capacity recovery of back-end systems of a storage system upon removal of a storage group from the storage system when the back-end drives are implemented using heterogeneous drives, according to some embodiments. As shown in FIG. 8, when a storage group is identified to be removed from the storage system (block 800), a Fully Automated Storage Tiering (FAST) simulation is run (block 805) to determine where the extents of data used by the storage group are located within the tiered storage system. In some embodiments, FAST software is configured to measure and record performance statistics such as the IO density on each slice or extent of data. This data is analyzed and used to make decisions regarding how to place particular slices of data across multiple storage tiers to maximize overall performance of the storage system. Slices that are highly accessed are automatically moved to the higher performing storage tiers, while slices with less activity move to lower performing storage tiers. For example, in some embodiments the current workload of each of the storage groups on the storage system is broken into skew chunks (block 810). Skew chunks, in this context, are capacity/load pairs that identify parts of the storage group workload that may have different IO densities, and, therefore, will be allocated to different disk technologies (storage tiers implemented by the homogeneous drives) in the FAST simulation. The skew chunks are mapped to storage pools (storage tiers) based on disk model, storage pool service level expectation (SLE), respective storage group service level objective (SLO), and storage tier capacity (block 815). Current utilization values are generated for the back-end components (back-end ports, back-end directors, and thin pools) based on the skew chunk mapping (block 820). It should be noted that the skew chunk mapping specifies the particular back-end director, back-end port, and drive where the data associated with the skew chunk should be stored. Accordingly, the skew chunk mapping maps the workload associated with the data of the skew chunk to the respective set of identified components of the back-end systems.

The skew chunks that are associated with the storage group selected in block 800 are then removed (block 825) and the Fully Automated Storage Tiering (FAST) simulation is re-run with the skew chunks of the selected storage group removed (block 830). In some embodiments the process described in connection with block 810-820 is used to redistribute the skew chunks of the remaining storage groups between the tiers of back-end storage. Redistribution of the skew chunks of the remaining storage groups will result in new skew chunk mapping and, accordingly, new utilization values for the back-end components in block 820. Specifically, as shown in FIG. 8, the remaining storage group application workloads are broken into skew chunks (block 835), the skew chunks are mapped to storage pools (storage tiers) based on disk model, pool service level expectation (SLE), storage group service level objective (SLO), and storage tier capacity (block 840). Revised utilization values are generated for the back-end components (back-end ports, back-end directors, and thin pools) based on the revised skew chunk mapping (block 845)

The workload planner 200 is then able to determine the differences between the current utilization values of the back-end components (back-end ports, back-end directors, and thin pools) and the revised values of the back-end components (back-end ports, back-end directors, and thin pools). The capacity recovery is based, in some embodiments, by comparing the current highest bucketized utilization value of any back-end component with the revised highest bucketized utilization value of any back-end component (block 850). The workload planner 200 accordingly generates the result (block 855) identifying the capacity recovery of the back-end components of the storage system associated with removal of the storage group from the storage system.

FIG. 9 is a flow chart of an example method of resolving capacity recovery of back-end systems of a storage system upon removal of a storage group from the storage system when the back-end drives are implemented using homogeneous drives, according to some embodiments. As shown in FIG. 9, in embodiments where the back-end drives are homogenous (all the same), it might not be beneficial to divide the storage resources into storage tiers and, accordingly, a Fully Automated Storage Tiering process is not required to be used to map skew chunks to the back-end storage resources.

Rather, when a storage group is identified to be removed from the storage system (block 900), the workload planner 200 extracts the system configuration data and current storage system performance data from a data collector framework (block 905). The workload planner 200 bucketizes the data into a format readable by the essential performance library 175 (block 910). The essential performance library calculates a growth factor for the current storage system (block 915). In some embodiments, the growth factor is a multiplier representing how much more of the current existing storage system workload can be added to the storage system without surpassing a system component's best practice performance threshold. Inverting the growth factor returns the current utilization for each of the back-end components.

The workload planner 200 then removes the storage group object and performance statistics from the system application workload list (block 920) and re-runs the workload model with the storage group workload removed (block 925). The essential performance library 175 calculates a revised growth factor representing how much additional workload the storage system components could accommodate, based on the workload characteristics of the remaining workload (block 930). The revised utilization values of the backend components are determined by inverting the revised growth factors. In some embodiments, the capacity recovery of the back-end components is based on a maximum bucketized difference between the current maximum bucketized utilization value and the revised maximum bucketized utilization value (block 935).

Figure 10:
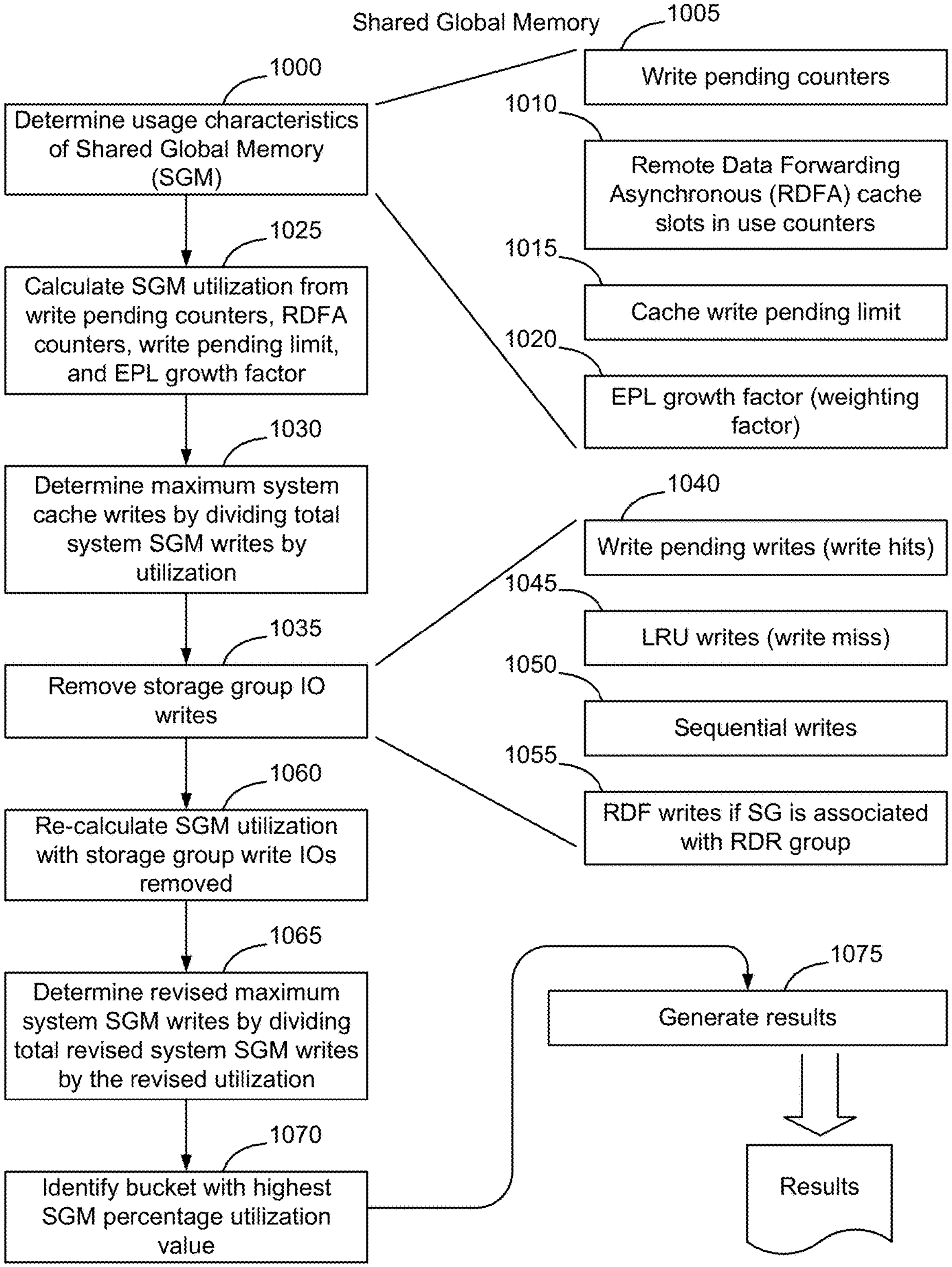
FIG. 10 is a flow chart of an example method of resolving capacity recovery of shared global memory of a storage system upon removal of a storage group from the storage system, according to some embodiments.

FIG. 10 is a flow chart of an example method of resolving capacity recovery of shared global memory of a storage system upon removal of a storage group from the storage system, according to some embodiments. Shared global memory is used, in some embodiments, by allocating slots of shared global memory in connection with both read and write operations on a storage group. For example, in connection with read IO operations, in some embodiments the requested data is read from back-end storage resources into a slot of shared global memory and then read out of the slot of shared global memory by the front-end adapter. Once the data has been read out of the slot of shared global memory, the slot can be reallocated to be used in connection with another read IO or write IO. In connection with a write IO operation, in some embodiments data is received by the front-end adapter and stored in a slot of shared global memory until the data is able to be read out (destaged) to back-end storage resources.

It may take significantly longer to destage data to back-end storage resources in connection with a write operation than it does to read data out of shared global memory by a front-end adapter in connection with a read operation. Accordingly, the amount shared global memory resources used by a given storage group associated with write operations is assumed to be much greater than the amount of shared global memory resources used by the storage group in connection with read operations. According to some embodiments, to determine capacity recovery of shared global memory in connection with removing a storage group from the storage system, only the write operations associated with the storage group are considered as impactful on the shared global memory. Although some embodiments are described in which the workload planner focuses on determining the impact of storage group write operations on shared global memory, it should be understood that the read operations may be considered as well, depending on the implementation.

As shown in FIG. 10, in some embodiments to determine the capacity recovery impacts of removing a storage group from the storage system, the workload planner 200 determines the current usage characteristics of shared global memory (block 1000). The current usage characteristics may be determined from write pending counters (block 1005), remote data forwarding (asynchronous) RDFA slots in use counters (block 1010), the cache write pending limit (block 1015), and the essential performance library (EPL) growth factor 1020. In some embodiments, the shared global memory (SGM) utilization is calculated by subtracting the RDFA cache slots in use from the system write pending, and dividing by the write pending limit. Using the system-level writes to shared global memory, it is possible to calculate the maximum system writes=observed SGM writes/SGM utilization.

In some embodiments, for example as discussed in greater detail with FIG. 9, the EPL growth factor specifies how much more of the current workload may be added to the storage system before meeting a best practices maximum use level for the component. The workload planner 200 uses the characteristics (blocks 1005-1020) to calculate the current shared global memory utilization (block 1025). The maximum system cache writes is then able to be determined by dividing the total system shared global memory writes by the utilization value (block 1030).

The workload planner 200 then retrieves the workload characteristics of the storage group associated with write operations from the storage group KPI data structure 215 (block 1035). In some embodiments, the workload characteristics of the storage group associated with write operations include write pending writes (write hits) (block 1040), the LRU writes (write miss operations) (block 1045), and sequential writes (block 1050). A write hit occurs when a write operation is received that is on data that is currently contained in the shared global memory. A write miss occurs when a write operation is received that is on data that is not currently contained in the shared global memory. In some embodiments, where a given write IO is allowed to have a size large enough to possibly require allocation of more than one slot of shared global memory, the workload planner retrieves write operation KPI values in both IOPS and MBPS, to determine a number of slots required to implement the storage group workload on the shared global memory. In embodiments where the size of a given write IO is restricted to be equal to or lesser than the size of a given slot of shared global memory, the workload planner may retrieve the write KPI IOPS values under the assumption that each write IO will correlate to allocation of a single slot of shared global memory.

In some embodiments, the workload planner 200 also determines from the remote data forwarding process 165 whether an asynchronous remote data forwarding mirroring pairing has been established for the storage group. Remote Data Forwarding (RDF) enables write operations to be replicated from a first storage system to a second storage system. In synchronous RDF, a write IO is acknowledged by the destination array prior to accepting a subsequent IO by the primary array to the host. In asynchronous RDF, the primary array will acknowledge the write IO to the host prior to receiving acknowledgement from the destination array. This enables the primary array and destination array to be one or more write IO operations out of synchronization. Accordingly, if the storage group is participating in an asynchronous RDF mirroring arrangement, the asynchronous nature of the RDF mirroring can have an impact on the shared global memory, since the write IO will be required to be retained in shared global memory until the write IO is acknowledged by the destination array. Accordingly, in response to a determination by the workload planner 200 that the storage group that is to be removed from the storage system is participating in an asynchronous RDF mirroring arrangement, the workload planner 200 also determines the RDF writes associated with the storage group and removes that workload from the shared global memory (block 1055).

After removing the storage group IO writes from the current usage characteristics (block 1035), the workload planner 200 re-calculates the shared global memory utilization with the storage group write IOs (and RDF writes) removed (block 1060). Based on the recalculated shared global memory utilization, the workload planner 200 determines a new revised maximum system shared global memory write operations by dividing the total revised system SGM writes by the revised utilization (block 1065). The workload planner 200 then identifies the time-series bucket with the revised highest shared global memory utilization value (block 1070), which is used to generate the capacity recovery result specifying the capacity recovery on shared global memory associated with removal of the storage group from the storage system (block 1075).

Figure 11:
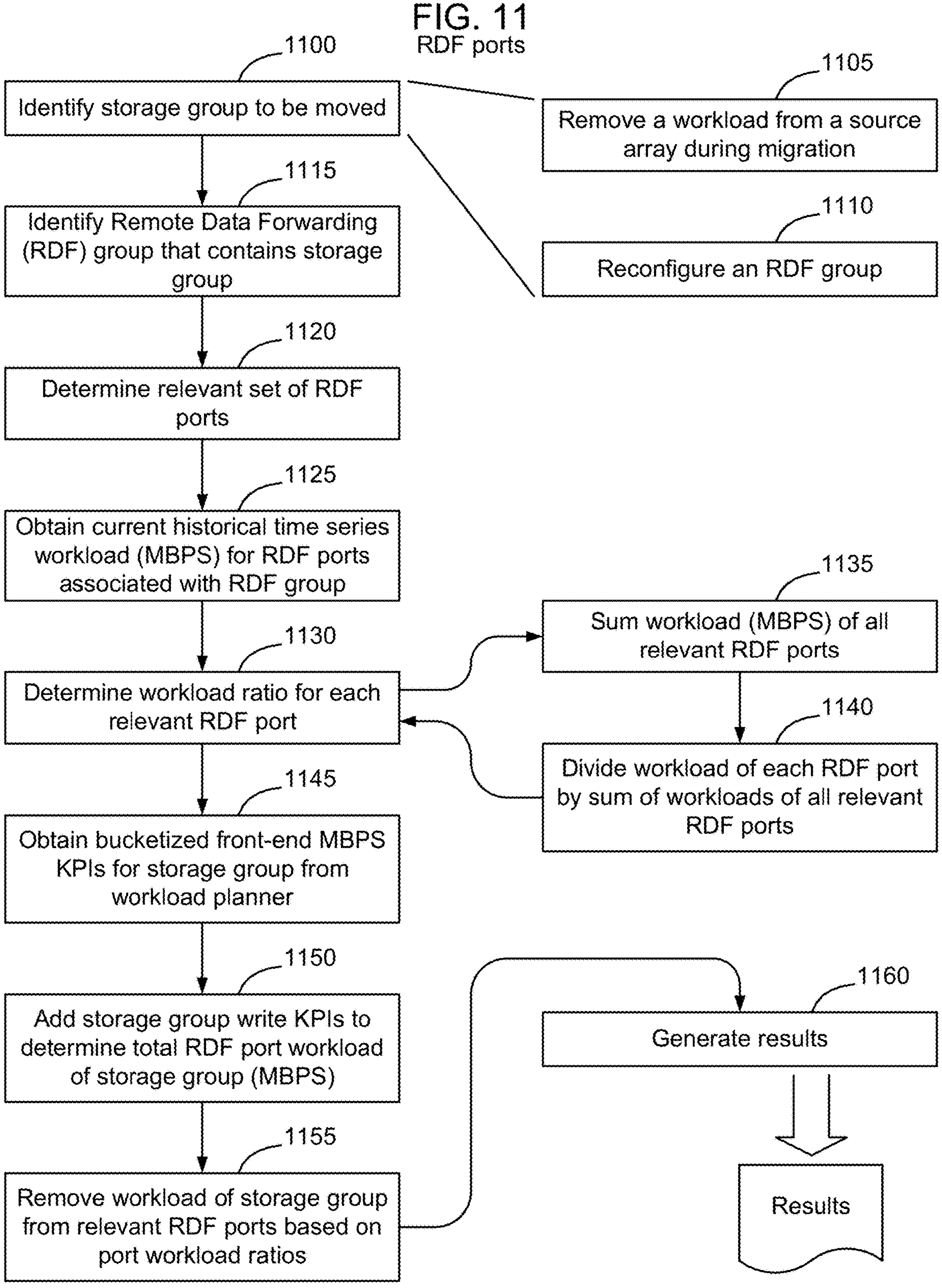
FIG. 11 is a flow chart of an example method of resolving capacity recovery of RDF ports of a storage system upon removal of a storage group from the storage system, according to some embodiments.

FIG. 11 is a flow chart of an example method of resolving capacity recovery of RDF ports of a storage system upon removal of a storage group from the storage system, according to some embodiments. As shown in FIG. 11, when a storage group is identified to be moved (block 1100), movement of the storage group might affect the RDF ports on the storage systems. For example, movement of a storage group might affect the RDF ports if storage group is moved off of the storage system in connection with a migration event (block 1105). Movement of the storage group might also affect the RDF ports, for example in connection with reconfiguration of an RDF group 1110. It should be noted that, in some embodiments, a determination is also made as to whether the storage group that is selected in block 1100 is protected using an RDF session. If the storage group is not associated with an RDF session, movement of the storage group off the storage system will not have any effect on the RDF ports and, accordingly, the process shown in FIG. 11 can be skipped.

Once the storage group has been determined to be consuming RDF port capacity, and that the movement of the storage group will have a capacity recovery effect on the RDF ports, in some embodiments the workload planner 200 identifies the RDF group that contains the storage group (block 1115), and determines the relevant set of RDF ports for the RDF group (block 1120).

The workload planner 200 then obtains the historical time series workload (MBPS) for the selected RDF ports from the component KPI data structure 210 and determines the workload ratio for each of the RDF ports (block 1130). In a manner similar to the process described in connection with front-end port usage (FIG. 5, blocks 530-540), in some embodiments the workload planner 200 sums the workload (MBPS) of all the relevant RDF ports, and divides the workload of each RDF port by the sum of the workload of all relevant RDF ports to determine the workload ratio for each of the relevant RDF ports.

The workload planner then obtains the bucketized front-end MBPS KPIs for the storage group from the workload planner 200 (block 1145). Because RDF operations are used to protect write operations, and the relevant RDF ports not impacted by read operations on the storage group, in some embodiments the bucketized front-end KPIs retrieved by the workload planner 200 in block 1145 include the write hit, write miss, and sequential write operations (MBPS). The workload planner 200 then adds the storage group write KPIs to determine the total RDF port workload for the storage group (block 1150). The workload planner 200 then removes the workload of the storage group from the relevant RDF ports based on the port workload ratios calculated in block 1130 (block 1155). The workload planner 200 then generates as a result the capacity recovery of each relevant RDF port (block 1160).

Figure 12:
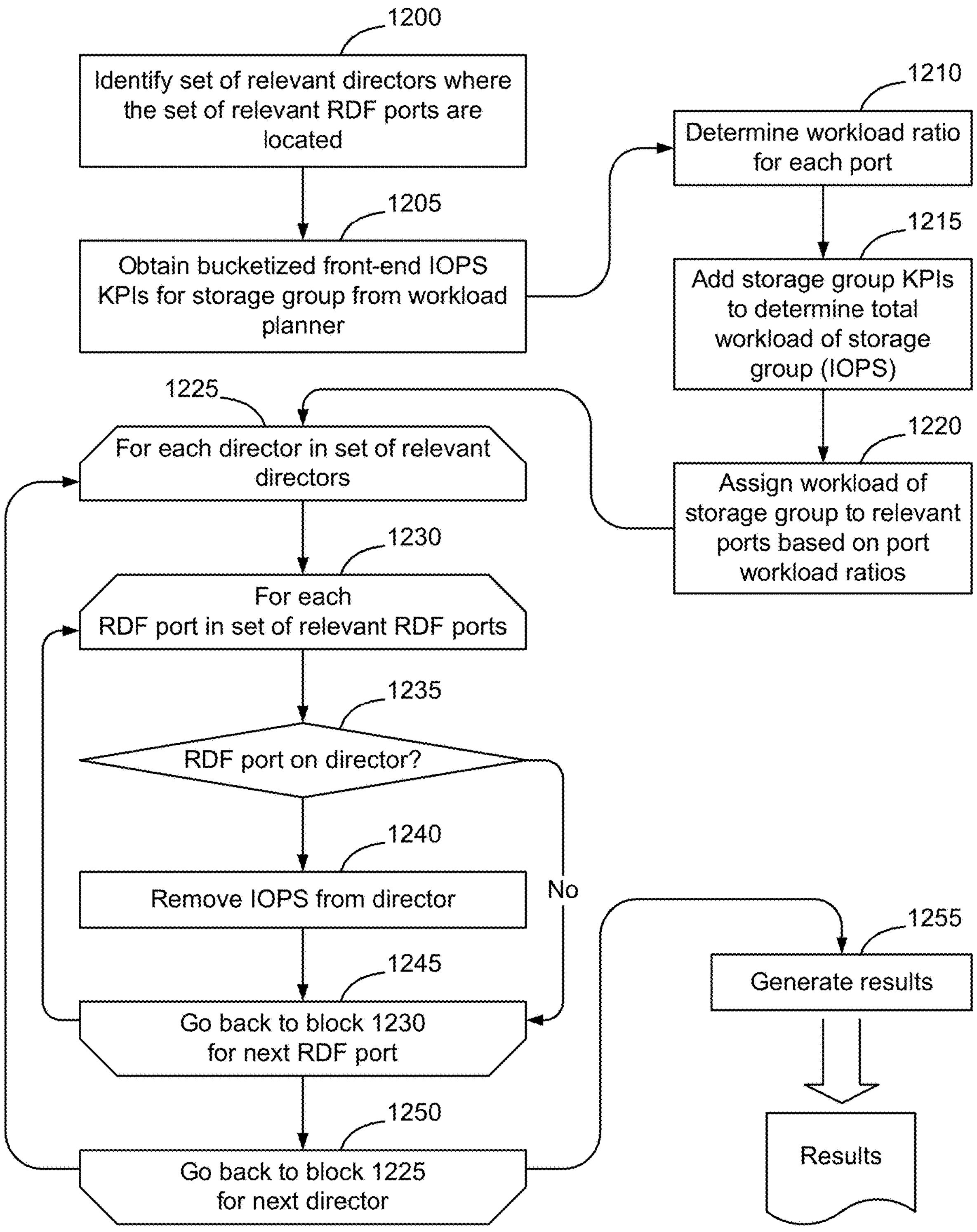
FIG. 12 is a flow chart of an example method of resolving capacity recovery of RDF directors of a storage system upon removal of a storage group from the storage system, according to some embodiments.

FIG. 12 is a flow chart of an example method of resolving capacity recovery of RDF directors of a storage system upon removal of a storage group from the storage system, according to some embodiments.

As shown in FIG. 12, in some embodiments to resolve the capacity recovery on a set of RDF directors, a set of relevant RDF ports is determined (FIG. 11 block 1120), and the location of the set of relevant RDF ports is used to identify a set of relevant RDF directors (block 1200). Specifically, a set of relevant directors is a set of directors where the relevant RDF ports are located.

In some embodiments, workload on a given director is characterized using a number of IO operations processed by the director per second (IOPS). To resolve an amount of capacity recovered from a director associated with RDF operations implemented to protect a particular storage group, the workload planner 200 then obtains the bucketized front-end IOPS KPI values for the storage group from the storage group KPI data structure 215 (block 1205). In some embodiments, the workload planner 200 determines the workload ratio for each RDF port (block 1210), and adds the storage group KPIs to determine the total workload of the storage group (IOPS) (block 1215). As shown in FIG. 4, in some embodiments the KPI values that are expressed in IOPS include the storage group write hit, storage group write miss, and storage group sequential writes. In some embodiments the workload planner 200 sums these values for each of the buckets. The workload planner 200 then assigns the workload of the storage group to the relevant RDF ports based on the RDF port workload ratios (block 1225).

The workload planner 200 resolves capacity recovery on the directors by removing the workload of the storage group based on where the RDF ports used by the storage group are located. For example, in some embodiments the workload planner 200 selects a first director (block 1225), and a first of the relevant RDF ports (block 1230), and determines whether the selected RDF port is on the selected director (block 1235). If the RDF port is on the director (a determination of YES at block 1235) the workload planner 200 removes the storage group workload assigned to the RDF port in block 620 from the selected director (block 1240). If the RDF port is not on the selected director (a determination of NO at block 1235) the workload planner 200 moves to the next RDF port. The process iterates until all relevant RDF ports have been evaluated against the selected director. Once all RDF ports have been evaluated against a selected director, the workload planner 200 returns to block 1225 to select a next director. This process iterates until all the workloads for all of the relevant RDF ports allocated in block 1220 have been removed from the relevant directors based on where the RDF ports reside. Once the workloads of the relevant RDF ports have been removed from the director workloads, the workload planner 200 generates results (block 1255) which are output.

FIGS. 13 and 14 are graphs showing example hypothetical fluctuations of an example component utilization of a component on a storage system over a two-week period of time, prior to removal of a workload associated with a selected storage group from the storage system (FIG. 13), and after removal of the workload associated with the selected storage group from the storage system (FIG. 14). In the example shown in FIG. 13, the maximum utilization of a particular component is determined to occur during several buckets on Saturday, and be equal to a value of approximately 75%. After removing a storage group, as shown in FIG. 14, the maximum utilization of the particular component has changed such that the particular component has a maximum utilization of approximately 60% on Thursday. Accordingly, by looking at component utilization values over a monitoring interval, such as the two-week monitoring interval shown in FIGS. 13 and 14, and comparing the component maximum utilization values before removal of the storage group and after simulated removal of the storage group, it is possible to determine an amount of capacity recovered for that particular component. In FIGS. 13 and 14, the resolved capacity recover is 15% (75%−60%=15%). By providing a system that is configured to resolve capacity recovery across multiple components of a storage system, it is possible to determine the full impact of removal of a particular storage group on each of the individual components of the storage system. This enables more advanced planning to be implemented, and enables a very granular intelligence to be provided into the specific impact each storage group has on each of the components of the storage system.

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random-access memory, a computer memory, a disk drive, or other storage medium. All such embodiments are intended to fall within the scope of the present invention.

Throughout the entirety of the present disclosure, use of the articles “a” or “an” to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A system for resolving capacity recovery across a plurality of components of a storage system in connection with simulated removal of one storage group of a set of storage groups from the storage system, comprising:
- one or more computers and one or more storage devices storing instructions that are operable, when executed by the one or more computers, to cause the one or more computers to perform operations comprising:
- maintaining a storage system component Key Performance Index (KPI) data structure containing a plurality of KPI values for each of the storage system components;
- maintaining a storage group KPI data structure containing a plurality of KPI values for each storage group of the set of storage groups of the storage system; and
- using the storage system KPI values and storage group KPI values for the one storage group of the set of storage groups to simulate removal of the one storage group of the set of storage groups from each of the plurality of components of the storage system, the plurality of components of the storage system including a set of front-end ports of the storage system, a set of front-end directors of the storage system, a set of back-end ports of the storage system, a set of back-end directors of the storage system, and a shared global memory of the storage system.

2. The system of claim 1, wherein simulating removal of the one storage group of the set of storage groups on the set of front-end ports of the storage system comprises:
- identifying a relevant set of front-end ports for the storage group;
- obtaining a time series of overall workload bandwidth values for each front-end port of the relevant set of front-end ports, the overall workload bandwidth values being specified as numbers of bytes per second;
- determining a workload ratio for each front-end port of the relevant set of front-end ports from the time series overall workload bandwidths values;
- determining the storage group workload bandwidth for the storage group, the storage group workload bandwidth being a subset of the overall workload bandwidth for the identified relevant set of front-end ports and being specified as numbers of bytes per second; and
- removing the storage group workload bandwidth from each front-end port of the relevant set of front-end ports according to the determined respective workload ratio for the respective front-end port.

3. The system of claim 2, wherein identifying the relevant set of front-end ports comprises identifying all front-end ports that are in a port group in a masking view associated with the storage group, and that are also zoned to an initiator in an initiator group associated with the masking view.

4. The system of claim 2, wherein determining the workload ratio for each front-end port of the relevant set of front-end ports comprises summing the overall workload bandwidth values for each front-end port of the relevant set of front-end ports during each time slot of the time series, and dividing each respective overall workload bandwidth value for each respective front-end port of the relevant set of front-end ports by the sum of the overall workload bandwidth values during each slot of the time series.

5. The system of claim 2, wherein a first subset of the plurality of KPI values contained in the storage system component Key Performance Index (KPI) data structure include the time series overall workload bandwidth values for each front-end port of the relevant set of front-end ports, the overall workload bandwidth values being specified as numbers of bytes per second.

6. The system of claim 2, wherein simulating removal of the one storage group of the set of storage groups on the set of front-end directors of the storage system comprises:
- identifying a set of relevant front-end directors where the front-end ports of the relevant set of front-end ports for the storage group are located;
- determining which front-end ports of the relevant set of front-end ports are located on each relevant front-end director;
- obtaining time series number of storage group IO operations per second implemented by the storage group;
- allocating proportions of storage group IO operations per second to each front-end port of relevant set of front-end ports according to the workload ratios for each front-end port of the relevant set of front-end ports;
- determining overall IO operations per second for each front-end director of the set of relevant front-end directors; and
- removing the allocated proportion of storage group IO operations per second from each relevant front-end director according to the locations of the front-end ports;
- wherein the overall IO operations per second for each respective front-end director is reduced by removing the allocated portion of storage group IO operations of each front-end port that is located on the respective front-end director.

7. The system of claim 1, wherein simulating removal of the one storage group of the set of storage groups on the set of back-end ports and set of back-end directors of the storage system comprises:
- determining that the set of back-end ports and set of back-end directors are connected to heterogeneous storage devices implementing a tiered storage array;
- running a tiered storage placement simulation to create a skew chunk mapping, each skew chunk representing an input/output (IO) density on a particular slice of data, the skew chunk mapping assigning the skew chunks of data into tiers of the tiered back-end storage array, the skew chunks of data including data of the storage group as well as data of the other storage groups of the set of storage groups;

generating current back-end port and back-end director utilization values based on the skew chunk mapping;

removing the skew chunks associated with the storage group;

re-running the tiered storage placement simulation to create a revised skew chunk mapping;

generating revised back-end port and back-end director utilization values based on the revised skew chunk mapping; and comparing the current back-end port and back-end director utilization values with the revised back-end port and back-end director utilization values.

8. The system of claim 7, wherein the tiered storage placement simulation identifies parts of workloads that have different IO densities and allocates skew chunks with higher IO densities to a higher performing storage tier and allocates skew chunks with lower IO densities to a lower performing storage tier.

9. The system of claim 8, wherein a first subset of the back-end ports and a first subset of the back-end directors are used to handle IO transactions on the higher performing storage tier; and wherein a second subset of the back-end ports and a second subset of the back-end directors are used to handle IO transactions on the lower performing storage tier.

10. The system of claim 1, wherein simulating removal of the one storage group of the set of storage groups on the set of back-end ports and set of back-end directors of the storage system comprises:

determining that the set of back-end ports and set of back-end directors are connected to homogeneous storage devices implementing a storage array;

obtaining a bucketized workload bandwidth for the set of back-end ports and bucketized IO operation values for the back-end directors;

calculating a current growth factor for the storage system, the current growth factor representing how much more of the existing storage system workload can be added to the storage system without exceeding best practices threshold values for the set of back-end ports and set of back-end directors;

removing the storage group workload from the bucketized workload bandwidth for the set of back-end ports and removing the storage group IO operations from the bucketized IO operation values for the back-end directors;

calculating a revised growth factor for the storage system, the revised growth factor representing how much more storage system workload can be added to the storage system with the workload of the storage group removed, without exceeding best practices threshold values for the set of back-end ports and set of back-end directors; and comparing the current back-end port growth factor and back-end director growth factor values with the revised back-end port growth factor and back-end director growth factor values.

11. The system of claim 10, wherein comparing current back-end port growth factor and back-end director growth factor values with the revised back-end port growth factor and back-end director growth factor values comprises:

inverting the current back-end port growth factor and the back-end director growth factor to obtain a current back-end port utilization value and a current back-end director utilization value;

inverting the revised back-end port growth factor and the back-end director growth factor to obtain a revised back-end port utilization value and a revised back-end director utilization value;

comparing the current back-end port utilization value with the revised back-end port utilization value; and comparing current back-end director utilization value with the revised back-end director utilization value.

12. The system of claim 1, wherein simulating removal of the one storage group of the set of storage groups on the shared global memory of the storage system comprises:

determining usage characteristics of shared global memory;

calculating a current bucketized shared global memory utilization value from the usage characteristics;

obtaining bucketized storage group write IO operation data;

removing the bucketized storage group write IO operation data from the usage characteristics to create revised usage characteristics; and calculating a revised bucketized shared global memory utilization value from the revised usage characteristics.

13. The system of claim 12, wherein the usage characteristics are based on write pending counters, remote data forwarding counters, a write pending limit, and a growth factor; and wherein the bucketized storage group write IO operation data includes bucketized write hit, write miss, and sequential write values.

14. The system of claim 1, wherein the plurality of components of the storage system further include a set of Remote Data Forwarding (RDF) ports and a set of RDF directors; and wherein simulating removal of the one storage group of the set of storage groups on the set of RDF ports of the storage system comprises:

determining that the one storage group is participating in an RDF session in which write operations to the storage group are mirrored on the RDF session to a peer storage system;

in response to determining that the one storage group is participating in the RDF session, identifying a relevant set of RDF ports for the storage group;

obtaining a time series of overall workload bandwidth values for each RDF port of the relevant set of RDF ports, the overall workload bandwidth values being specified as numbers of bytes per second;

determining a workload ratio for each RDF port of the relevant set of RDF ports from the time series overall workload bandwidths values;

determining the storage group workload bandwidth for the storage group, the storage group workload bandwidth being a subset of the overall workload bandwidth for the identified relevant set of RDF ports and being specified as numbers of bytes per second; and removing the storage group workload bandwidth from each RDF port of the relevant set of front-end ports according to the determined respective workload ratio for the respective front-end port.

15. The system of claim 14, wherein identifying the relevant set of RDF ports comprises identifying all RDF ports that are in a port group used to implement the RDF session for the storage group.

16. The system of claim 14, wherein determining the workload ratio for each RDF port of the relevant set of RDF ports comprises summing the overall workload bandwidth values for each RDF port of the relevant set of RDF ports during each time slot of the time series, and dividing each respective overall workload bandwidth value for each respective RDF port of the relevant set of RDF ports by the sum of the overall workload bandwidth values during each slot of the time series.

17. The system of claim 14, wherein a first subset of the plurality of KPI values contained in the storage system component Key Performance Index (KPI) data structure include the time series overall workload bandwidth values for each RDF port of the relevant set of RDF ports, the overall workload bandwidth values being specified as numbers of bytes per second.

18. The system of claim 14, wherein simulating removal of the one storage group of the set of storage groups on the set of RDF directors of the storage system comprises:

identifying a set of relevant RDF directors where the RDF ports of the relevant set of RDF ports for the storage group are located;

determining which RDF ports of the relevant set of RDF ports are located on each relevant RDF director;

obtaining time series number of storage group IO write operations per second implemented by the storage group;

allocating proportions of storage group IO write operations per second to each RDF port of relevant set of RDF ports according to the workload ratios for each RDF port of the relevant set of RDF ports;

determining overall IO operations per second for each RDF director of the set of relevant RDF directors; and removing the allocated proportion of storage group IO operations per second from each relevant RDF director according to the locations of the RDF ports;

wherein the overall IO operations per second for each respective RDF director is reduced by removing the allocated portion of storage group write IO operations of each RDF port that is located on the respective RDF director.

* * * * *